(12) United States Patent
Aburakhia et al.

(10) Patent No.: US 12,277,415 B2
(45) Date of Patent: Apr. 15, 2025

(54) METHOD TO PRIORITIZE THIRD-PARTY SOFTWARE LIBRARIES UPDATES

(71) Applicant: KING FAHD UNIVERSITY OF PETROLEUM AND MINERALS, Dhahran (SA)

(72) Inventors: Abdalrahman Awad Aburakhia, Dhahran (SA); Mohammad Rabah Alshayeb, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 160 days.

(21) Appl. No.: 18/317,999

(22) Filed: May 16, 2023

(65) Prior Publication Data

US 2024/0385828 A1 Nov. 21, 2024

(51) Int. Cl.
*G06F 8/658* (2018.01)
*G06F 8/77* (2018.01)

(52) U.S. Cl.
CPC ............. *G06F 8/658* (2018.02); *G06F 8/77* (2013.01)

(58) Field of Classification Search
CPC .............................. G06F 8/60–66; G06F 8/77
USPC ................................................. 717/168–178
See application file for complete search history.

(56) References Cited

U.S. PATENT DOCUMENTS 11,210,083 B1 * 12/2021 Abadi ...................... G06F 8/71
2019/0079734 A1 * 3/2019 Kadam ................ G06F 21/577
2020/0242254 A1 7/2020 Velur et al.

FOREIGN PATENT DOCUMENTS

CN 113157314 A 7/2021

OTHER PUBLICATIONS

Salza, Pasquale, et al., Third-party libraries in mobile apps: When, how, and why developers update them, Empirical Software Engineering, 2020, 37 pages, [retrieved on Dec. 16, 2024], Retrieved from the Internet: <URL:https://link.springer.com/article/10.1007/s10664-019-09754-1>.*

Polese, Aidan, et al., Adoption of Third-party Libraries in Mobile Apps: A Case Study on Open-source Android Applications, Proc of the 9th IEEE/ACM International Conference on Mobile Software Engineering and Systems, 2022, 11 pages, [retrieved on Dec. 16, 2024], Retrieved from the Internet: <URL:http://dl.acm.org/>.*

(Continued)

*Primary Examiner* — Geoffrey R St Leger
(74) *Attorney, Agent, or Firm* — Oblon, McClelland, Maier & Neustadt, L.L.P.

(57) ABSTRACT

A method of prioritizing updates to third-party libraries for a mobile application includes obtaining a list of a plurality of third-party libraries used in the mobile application. The method further includes, for each third-party library of the plurality of third-party libraries, computing a set of third-party library metrics of a third-party library and computing a weight for each third-party library metric type of the set of third-party library metrics. The method further includes computing, for each third-party library of the plurality of third-party libraries, a ranking value of the third-party library using the set of third-party library metrics and the weights, and selecting, based on the ranking value of the plurality of third-party libraries, one or more third-party libraries to be updated.

14 Claims, 23 Drawing Sheets

(56) References Cited

OTHER PUBLICATIONS

Salza et al. ; Do Developers Update Third-Party Libraries in Mobile Apps? ; ICPC '18:26$^{th}$ International Conference on Program comprehension ; May 2018 ; 12 Pages.

Bauer et al. ; A Structured Approach to Assess Third-Party Library Usage ; ResearchGate ; Sep. 2012.

Nguyen et al . ; DeepLib: Machine Translation Techniques to Recommend Upgrades for Third-party Libraries ; Expert Systems with Applications ; Apr. 2022 ; 49 Pages.

Ogawa et al. ; User-Side Updating of Third-Party Libraries for Android Applications ; Nagoya Institute of Technology Repository ; 2018 Sixth International Symposium on Computing and Networking Workshops (CANDARW 2018) ; 8 Pages.

He et al. ; A Multi-Metric Ranking Approach for Library Migration Recommendations ; 2021 IEEE International Conference on Software Analysis, Evolution and Reengineering (SANER) ; 2021 ; 12 Pages.

Li et al. ; AppCommune: Automated Third-Party Libraries De-duplicating and Updating for Android Apps ; Lab of Cryptology and Computer Security, Shanghai Jiao Tong University ; 2019 ; 11 Pages.

\* cited by examiner

```
C:\Windows\System32\cmd.exe - rasa shell                    —   □   ×

Your input -> rank my libraries
You successfully selected all critiria with a consistency ratio: 0.017,
and AHP weights are
Compatibility: 0.358
Business_Value: 0.302
Update_Effort: 0.23
Accessability: 0.11
Priritization Results ##
The following libraries has security issue:  ##
Library .2 has 2 vulnerabilities
Library .3 has 2 vulnerabilities
//// ##
Note: Library com.google.zxing:core:3.3.3 has high confidence in Compatibility compared to others
com.jakewharton:butterknife:10.1.0 has ranking value of 0.66
.2 has ranking value of 0.6
.3 has ranking value of 0.59
com.afollestad.material-dialogs:core:0.9.6.0 has ranking value of 0.58
com.journeyapps:zxing-android-embedded:3.4.0 has ranking value of 0.53
com.airbnb.android:lottie:2.5.5 has ranking value of 0.52
```

FIG. 16

METHOD TO PRIORITIZE THIRD-PARTY SOFTWARE LIBRARIES UPDATES

BACKGROUND

Technical Field

The present disclosure is directed to systems and methods to prioritize third-party software libraries updates.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Software developers rely heavily on third-party libraries to reduce development costs. On one hand, the third-party libraries provide software developers with quick and easy-to-implement features. On the other hand, the third-party libraries come with liabilities, such as security vulnerabilities and high maintenance efforts when updating dependencies on the libraries. However, recent empirical studies showed that developers usually ignore those updates, which leads to greater technical issues and higher maintenance effort. Researchers have been developing approaches and techniques to tackle the domain of third-party libraries.

Conventional tools and references are provided as examples of approaches and techniques for handling third-party libraries. DeepLib which is a machine translation technique to recommend upgrades for third-party libraries is described (See: P. T. Nguyen et al., "*DeepLib: Machine translation techniques to recommend upgrades for third-party libraries*," Expert Syst. Appl., 2022, incorporated herein by reference in its entirety). A Dependabot tool is described (See: github.com/dependabot). A gradle versions plugin is described (See: https://github.com/ben-manes/gradle-versions-plugin). A gradle that uses the latest versions of plugin has been described (See: github.com/patrikerdes/gradle-use-latest-versions-plugin). A method for sharing third-party libraries between applications on the mobile device for de-duplication and updating is described (See: Li et al., "*Appcommune: Automated third-party libraries de-duplicating and updating for android apps*," in 2019 IEEE 26th International Conference on Software Analysis, Evolution and Reengineering (SANER), pp. 344-354. IEEE, 2019, incorporated herein by reference in its entirety). A prototype to update third-party libraries automatically through an external server which requires only the APK file of the application to update third-party libraries has been described (See: Ogawa et al., "*User-side updating of third-party libraries for android applications*" In 2018 Sixth International Symposium on Computing and Networking Workshops (CANDARW), pp. 452-458. IEEE, 2018, incorporated herein by reference in its entirety). An automated detection tool of third-party java library migration at a method level has been described (See: Alrubaye et al., "*Migrationminer: An automated detection tool of third-party java library migration at the method level*" In 2019 IEEE international conference on software maintenance and evolution (ICSME), pp. 414-417. IEEE, 2019, incorporated herein by reference in its entirety). A migration advisor tool for recommending library migrations from large-scale open-source data has been described (See: Minghui Zhou et al., "*Migrationadvisor: Recommending library migrations from large-scale open-source data*" In 2021 IEEE/ACM 43rd International Conference on Software Engineering: Companion Proceedings (ICSE-Companion), pp. 9-12. IEEE, 2021, incorporated herein by reference in its entirety). A similar approach has been described (See: Minghui Zhou et al., "*A multi-metric ranking approach for library migration recommendations*" In 2021 IEEE International Conference on Software Analysis, Evolution and Reengineering (SANER), pp. 72-83. IEEE, 2021, incorporated herein by reference in its entirety). RAPIM which is a machine learning tool to recommend methods replacement between two different third-party libraries has been described (See: H. Alrubaye et al., "*Learning to recommend third-party library migration opportunities at the API level*", Applied Soft Computing, 90, p. 106140, incorporated herein by reference in its entirety). A method for detecting API breaking changes has been described (See: Brito et al., "*APIDiff: Detecting API breaking changes*" In 2018 IEEE 25th International Conference on Software Analysis, Evolution and Reengineering (SANER), pp. 507-511. IEEE, 2018, incorporated herein by reference in its entirety). Machine translation techniques to recommend upgrades for third-party libraries has been described (See: Nguyen et al., "*DeepLib: Machine translation techniques to recommend upgrades for third-party libraries*" Expert Systems with Applications 202 (2022): 117267., incorporated herein by reference in its entirety). SAMOA which is a mobile application analysis tool is described. (See: Minelli et al., "*Software analytics for mobile applications—insights & lessons learned*" In 2013 17th European Conference on Software Maintenance and Reengineering, pp. 144-153. IEEE, 2013, incorporated herein by reference in its entirety) and (See: Michele Lanza et al., "*SAMOA—A Visual Software Analytics Platform for Mobile Applications*" In 2013 IEEE International Conference on Software Maintenance, pp. 476-479. IEEE, 2013, incorporated herein by reference in its entirety). However, the SAMOA tool focuses on third-party library calls (invocations) and no other aspects of third-party libraries. Further, an Atvhunter tool for reliable version detection of third-party libraries for vulnerability identification in android applications has been described. (See: Zhan et al., "*Atvhunter: Reliable version detection of third-party libraries for vulnerability identification in android applications*", in 2021 IEEE/ACM 43rd International Conference on Software Engineering (ICSE), pp. 1695-1707. IEEE, 2021, incorporated herein by reference in its entirety). Up2dep which is an Android tool support to fix insecure code dependencies has been described. (See: Nguyen et al., "*Up2dep: Android tool support to fix insecure code dependencies*", in Annual Computer Security Applications Conference, pp. 263-276. 2020, incorporated herein by reference in its entirety). An empirical study of usages, updates and risks of third-party libraries in java projects has been described. (See: Wang et al., "*An empirical study of usages, updates and risks of third-party libraries in java projects*", in 2020 IEEE International Conference on Software Maintenance and Evolution (ICSME), pp. 35-45. IEEE, 2020, incorporated herein by reference in its entirety). However, tools such as Atvhunter, Up2dep, and bug-driven alerting systems target mainly developers' awareness of security, e.g., vulnerabilities. Further, software developers utilize available dependencies during software development to help them with ready-made functionality. However, those dependencies come with their own risks and liability. Those risks involve security threats to the application, higher update effort, lower compatibility, and losing the library's new features.

Accordingly, there is a need for a system and a process that addresses the prioritization of third-party library updates for mobile applications.

SUMMARY

In an exemplary embodiment, a method of prioritizing updates to third-party libraries for a mobile application is described. The method includes obtaining a list of a plurality of third-party libraries used in the mobile application. The method further includes, for each third-party library of the plurality of third-party libraries, computing a set of third-party library metrics of a third-party library and computing a weight for each third-party library metric type of the set of third-party library metrics. The method further includes computing, for each third-party library of the plurality of third-party libraries, a ranking value of the third-party library using the set of third-party library metrics and the weights. Also, the method includes selecting, based on the ranking value of the plurality of third-party libraries, one or more third-party libraries to be updated.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 16 illustrates a display of chatbot prioritization results, according to certain embodiments.

DETAILED DESCRIPTION

Figure 1:
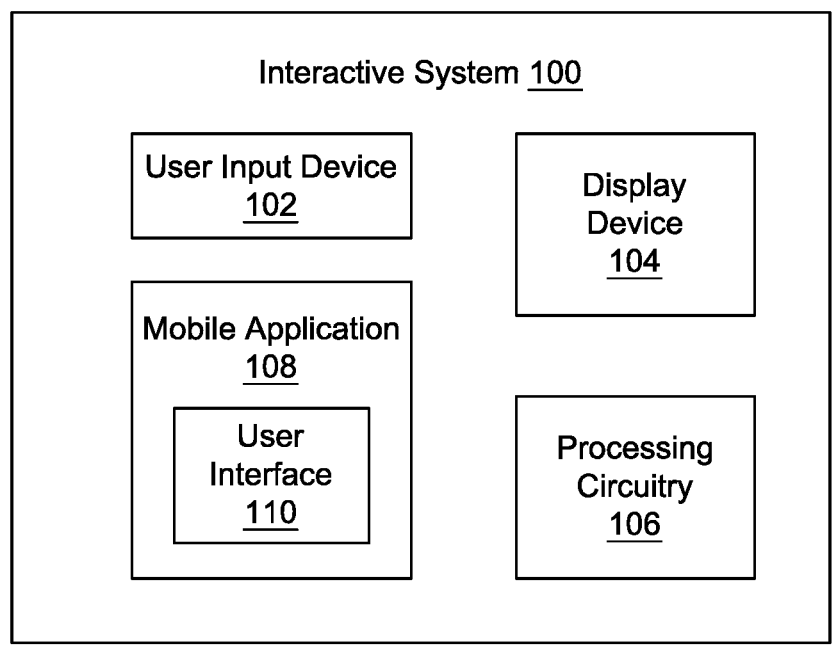
FIG. 1 depicts an interactive system for prioritizing updates to third-party libraries, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to systems and methods for prioritizing updates to third-party libraries. In particular, the systems and methods describe a prioritization approach for those third-party libraries that provide better insights for mobile application developers. In an example, a third-party library may be a reusable software component developed to be used by an entity other than an original developer of the component. In the context of the present disclosure, a third-party library may be referred to as a standalone software package/dependency that provides specific functionality for mobile application developers. The present disclosure provides mobile application developers the ability to gain insights about third-party libraries used in mobile applications and assists mobile application developers in prioritizing third-party libraries.

FIG. 1 depicts an interactive system 100 for prioritizing updates to third-party libraries, according to certain embodiments. The interactive system 100 may include a user input device 102, a display device 104, and a processing circuitry 106. In an implementation, the user input device 102 may include a mobile application 108 having a user interface 110.

The user input device 102 may be any device used by a user. In an example, the user may be a mobile application developer. In some examples, the user may be an end-user of the mobile application 108. The user input device 102 may be any computing device, such as a desktop computer, a laptop, a tablet computer, a mobile device, a Personal Digital Assistant (PDA), or any other computing device. The display device 104 may be a screen, a monitor connected to the user input device 102 in any manner, or any other appropriate display. The processing circuitry 106 may be implemented as one or more microprocessors, microcomputers, microcontrollers, digital signal processors, central processing units, state machines, logic circuitries, and/or any devices that manipulate signals based on operational instructions. The mobile application 108 may be a computer program or software application designed to run on a user input device, for example, the user input device 102. The user interface 110 may be a keyboard, a mouse, a touch screen, a haptic sensor, a voice-based input unit, or any other appropriate user interface.

Figure 2:
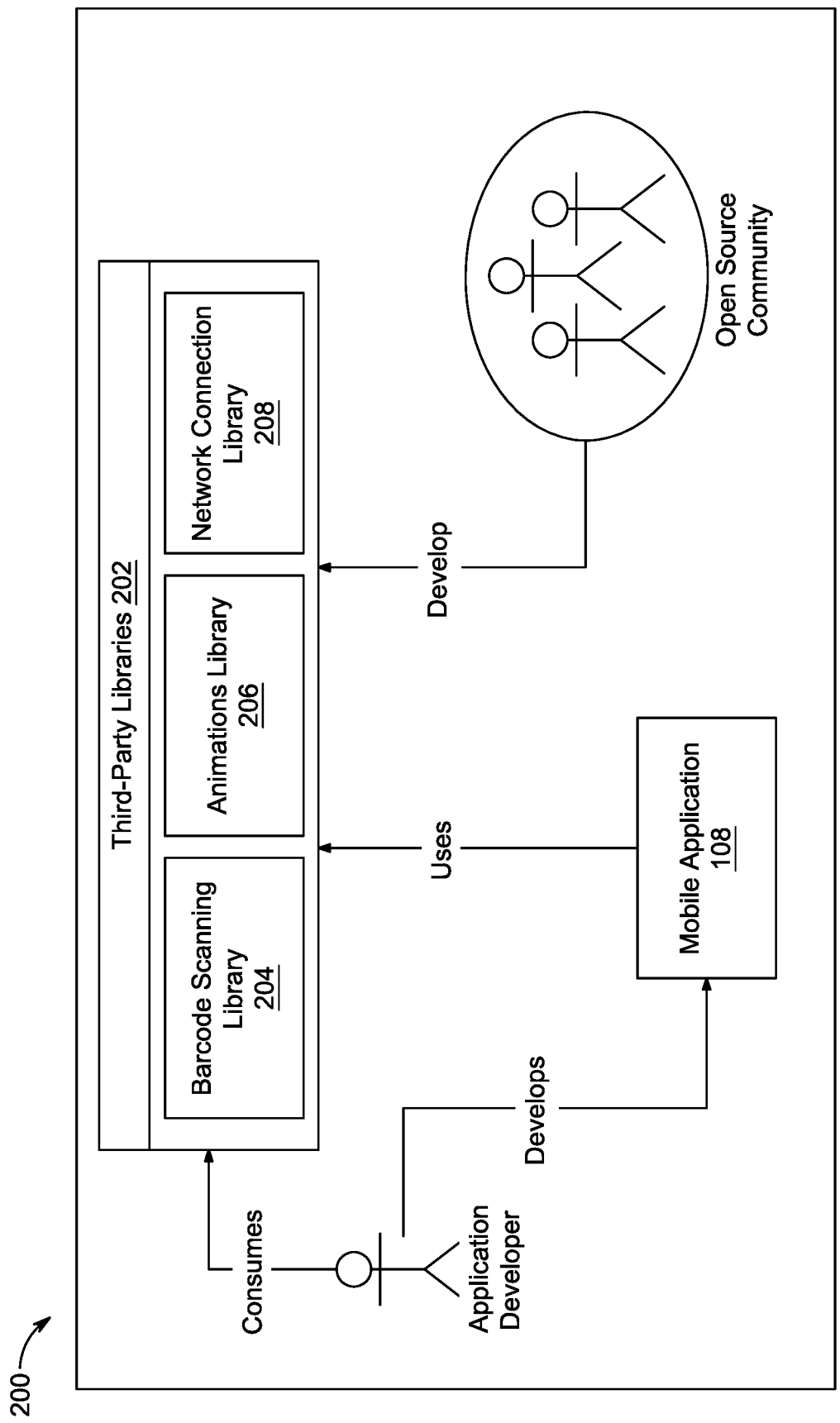
FIG. 2 depicts an example of third-party libraries usage in the mobile application 108, according to certain embodiments.

According to an implementation, the processing circuitry 106 may obtain a list of a plurality of third-party libraries used in the mobile application 108. In examples, obtaining the list of the plurality of third-party libraries may include inputting, via the user interface 110, the list of the plurality of third-party libraries. FIG. 2 depicts an example 200 of third-party libraries usage in the mobile application 108, according to certain embodiments. The third-party libraries are represented by reference numeral "202" in FIG. 2. As shown in FIG. 2, the third-party libraries 202 include a barcode scanning library 204, an animations library 206, a network connection library 208.

According to an implementation, for each third-party library of the plurality of third-party libraries, the processing circuitry 106 may be configured to compute a set of third-party library metrics. In examples, the set of third-party library metrics may include a compatibility metric, an update effort metric, an accessibility metric, a business value metric, and a security metric.

The compatibility metric measures a failure rate of a software application when using a current third-party library and when using an updated third-party library. In an example, the software application may be the mobile application 108 having the user interface 110. The update effort metric measures a rate of change of the third-party library. The accessibility metric measures the use rate of the third-party library. The business value metric measures user feedback on the third-party library. The security metric measures a number of security vulnerabilities in the software application when using the current third-party library and when using the updated third-party library.

In an example, the compatibility metric, the update effort metric, the accessibility metric, the business value metric, and the security metric, in combination, may be referred to as criteria and individually may be referred to as a criterion. These five criteria help mobile application developers gain deeper insights about third-party libraries installed in their applications. In an implementation, each criterion covers a specific domain and hence, they are combined from multiple factors, each of which tackles a particular aspect.

Figure 3:
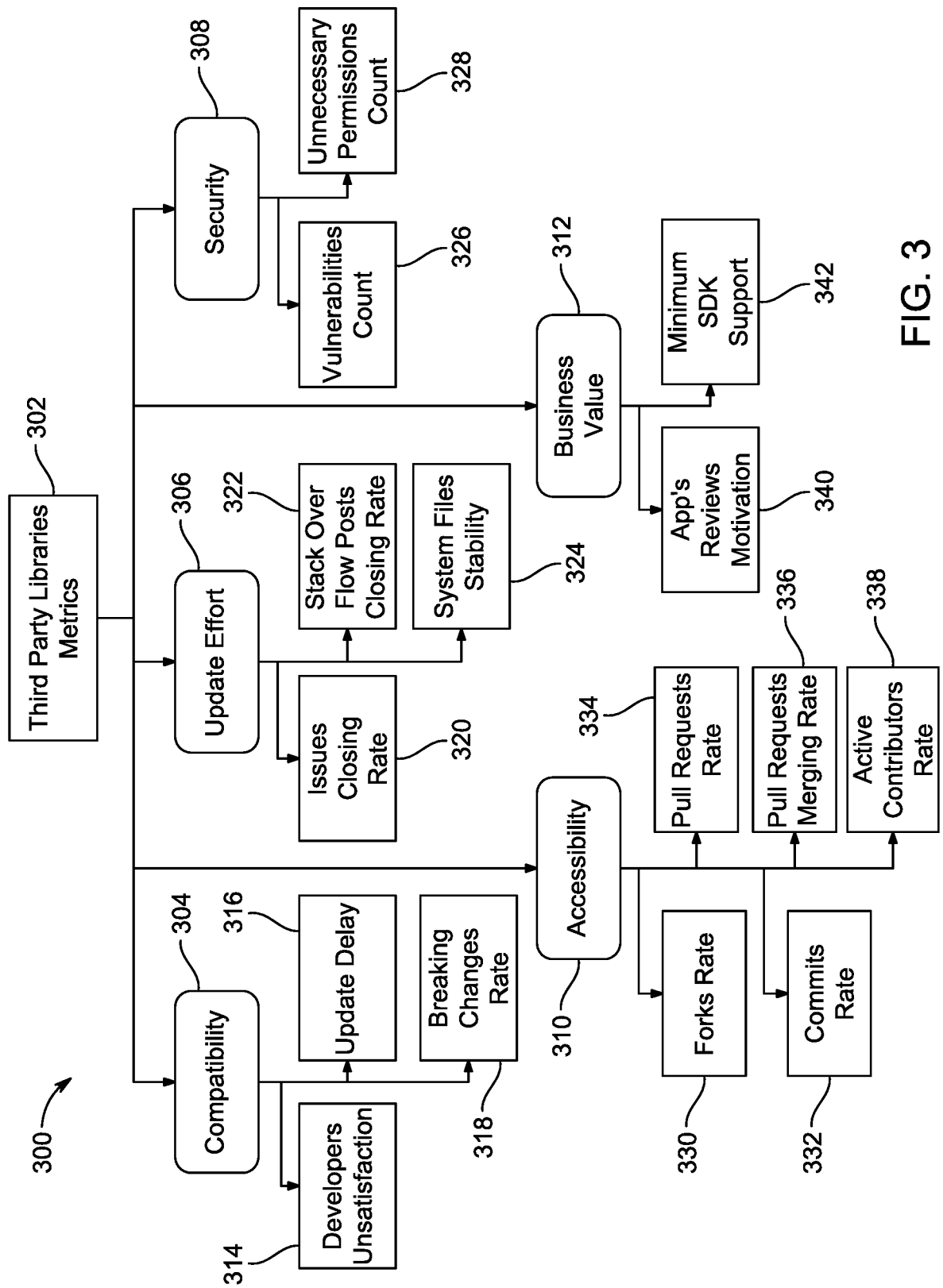
FIG. 3 depicts an example of distribution of third-party libraries metric and factors, according to certain embodiments.

FIG. 3 depicts an example 300 of distribution of third-party libraries metric and factors, according to certain embodiments.

In the example described in FIG. 3, the third-party libraries metrics 302 includes a compatibility metric 304, an update effort metric 306, a security metric 308, an accessibility metric 310, and a business value metric 312. The compatibility metric 304 may be a combination of three factors including developers unsatisfaction 314, update delay 316, and breaking changes rate 318. The update effort metric 306 may be a combination of three factors including issues closing rate 320, stackoverflow posts closing rate 322, and system files stability 324. The security metric 308 may be a combination of two factors including vulnerabilities count 326 and unnecessary permissions count 328. The accessibility metric 310 may be a combination of five factors including forks rate 330, commits rate 332, pull requests rate 334, pull requests merging rate 336, and active contributors rate 338. The business value metric 312 may be a combination of two factors including app's reviews motivation 340 and minimum software development kit (SDK) support 342.

Table 1 provided below describes factors considered for the compatibility metric 304.

TABLE 1

Compatibility Factors

| Factor | | |
|---|---|---|
| Developers' Unsatisfaction (DU) | D | DU measures library consumers complaining rate |
| | R | The existence of reported issues by the third-party library consumers (developers) decreases compatibility |
| | E | $DU = \dfrac{\text{Number of Reported Issues Last Quarter}}{\text{Number of Reported Issues}}$ |
| Update Delay (UD) | D | UD measures the releases gap between the installed release and the last release |
| | R | The larger the gap is between the currently used the third-party library release and the other release (latest by default) leads to lower compatibility |
| | E | $UD = 1 - \dfrac{\text{Current Installed Library Release Order}}{\text{Number of Library Releases}}$ |
| Breaking Changes Rate | D | BCR measures potential failures between third-party library releases |
| | R | The existence of breaking changes between third-party library releases decreases compatibility |
| | E | $BCR = \dfrac{NPBC}{NC}$ <br> NPBC: Number of potential breaking changes between two releases of a third-party library <br> NC: Number of changes between two releases of a third-party library |

D: Definition   R: Rationale   E: Equation

In an implementation, the compatibility may be measured as an average of the three factors' values using Equation (1) provided below.

$$\text{Compatability} = 1 - \dfrac{DU + UD + BCR}{3}. \qquad (1)$$

Table 2 provided below describes factors considered for the update effort metric 306.

TABLE 2

Update effort factors

| Factor | | |
|---|---|---|
| Issues Closing Rate (ICR) | D | ICR measures library public reported issues closing rate |
| | R | The existence of closed issues decreases update effort |
| | E | $ICR = \dfrac{\text{Number of Closed Reported Issues Last Quarter}}{\text{Number of Reported Issues Last Quarter}}$ |
| StackOverFlow Posts Closing Rate (SPCR) | D | SPCR measures library community public posts closing rate |
| | R | The existence of closed (answered) posts on the public community forums decreases update effort |
| | E | $SPCR = \dfrac{\text{Number of Closed Posts Last Quarter}}{\text{Number of Posts Last Quarter}}$ |

D: Definition   R: Rationale   E: Equation

TABLE 2-continued

Update effort factors

| Factor | D: Definition   R: Rationale   E: Equation | | |
|---|---|---|---|
| System Files Stability (SFS) | D | | SFS measures library source code change rate |
| | R | | The higher the system stability (in term files modification between releases) the lower the update effort might be |
| | E | | $SFS = 1 - \dfrac{\text{Number of Changed Files in Verison } i}{\text{Number of Files Before Version } i}$ |

In an implementation, the update effort may be measured as an average of the three factors values using Equation (2) provided below.

$$\text{Update Effort} = \dfrac{ICR + SPCR + SFS}{3}. \qquad (2)$$

Table 3 provided below describes factors considered for the security metric 308.

TABLE 3

Security Factors

| Factor | D: Definition   R: Rationale   E: Equation | |
|---|---|---|
| Vulnerabilities Count | D | VC measures security threats related to the third-party library |
| | R | The availability of security threats (vulnerabilities) related to the third-party library leads to lower security |
| | E | $VC = \Sigma \text{ Library}_{vulnerability}$ |
| Unnecessary Permissions Count | D | UPC measures identified unnecessary permissions in the third-party library's new release |
| | R | The availability of unnecessary permissions in the third-party library's new release leads to lower security |
| | E | $UPC = \Sigma \text{ Library}_{unnecessary\_permission}$ |

Table 4 provided below describes factors considered for the accessibility metric 310.

TABLE 4

Accessibility Factors

| Factor | D: Definition   R: Rationale   E: Equation | |
|---|---|---|
| Forks Rate (FR) | D | FR measures library public forks (cloning) rate |
| | R | Higher FR of the library repository indicates active development of the library |
| | E | $FR = \dfrac{\text{Number of Forks Last Quarter}}{\text{Number of Forks}}$ |
| Pull Requests Rate (PRR) | D | PRR measures library public pull requests rate |
| | R | Higher PRR to the library repository indicates active contribution by the community |
| | E | $PRR = \dfrac{\text{Number of Pull Request Last Quarter}}{\text{Number of Pull Requests}}$ |
| Pull Requests Merging Rate (PRMR) | D | PRMR measures library public pull requests merging rate |
| | R | Higher PRMR to the library repository indicates active contribution by the library maintainers |
| | E | $PRMR = \dfrac{\text{Number of Merged Pull Request Last Quarter}}{\text{Number of Pull Request Last Quarter}}$ |

TABLE 4-continued

Accessibility Factors

| Factor | D: Definition   R: Rationale   E: Equation | |
|---|---|---|
| Commits Rate (CR) | D | CR measures library public commits rate |
| | R | Higher CR to the library repository indicates the availability of actual contribution |
| | E | $CR = \dfrac{\text{Number of Commits Last Quarter}}{\text{Number of Commits}}$ |
| Active Contributors Rate (ACR) | D | ACR measures library public active contributors rate |
| | R | Higher ACR in the library repository indicates the availability of actual contributors |
| | E | $ACR = \dfrac{\text{Number of Contributors Last Quarter}}{\text{Number of Contributors}}$ |

In an implementation, the accessibility may be measured as an average of the five factors' values using Equation (3) provided below.

$$\text{Accessibility} = \dfrac{FR + PRR + PRMR + CR + ACR}{5}. \qquad (3)$$

Table 5 provided below describes factors considered for the business value metric 312.

TABLE 5

Business value factors

| Factor | D: Definition   R: Rationale   E: Equation | |
|---|---|---|
| App's Reviews Motivation (ARM) | D | ARM measures app end-users feedback related to the third-party library |
| | R | The availability of app reviews that are related to a specific category (e.g., GUI) might increase the business value of libraries in the same category |
| | E | $ARM = \dfrac{\text{Number of Related Reviews}}{\text{Number of Reviews}}$ |
| Minimum SDK Support (MSS) | D | MSS measures library support to the Platform (SDK) official market share |
| | R | If the third-party library requires an increase in the official minimum platform support (e.g., SDK version), it might decrease the library's business value |
| | E | Official Published SDK Support (Percentage) |

In an implementation, the business value may be measured as an average of the two factors' values using Equation (4) provided below.

$$\text{Business} = \dfrac{ARM + MSS}{2}. \qquad (4)$$

Referring back to FIG. 1, according to an implementation, the processing circuitry 106 may compute a weight for each third-party library metric type of the set of third-party library metrics. In an example, the weight for each third-party library metric type of the set of third-party library metrics may be computed based on generating a set of weights using an analytic hierarchy process. In an implementation, the processing circuitry 106 may select, based on the ranking value of the plurality of third-party libraries, one or more third-party libraries to be updated. In an example, while selecting the one or more third-party libraries, priority may be given to the security metric of the third-party library.

Figure 4:
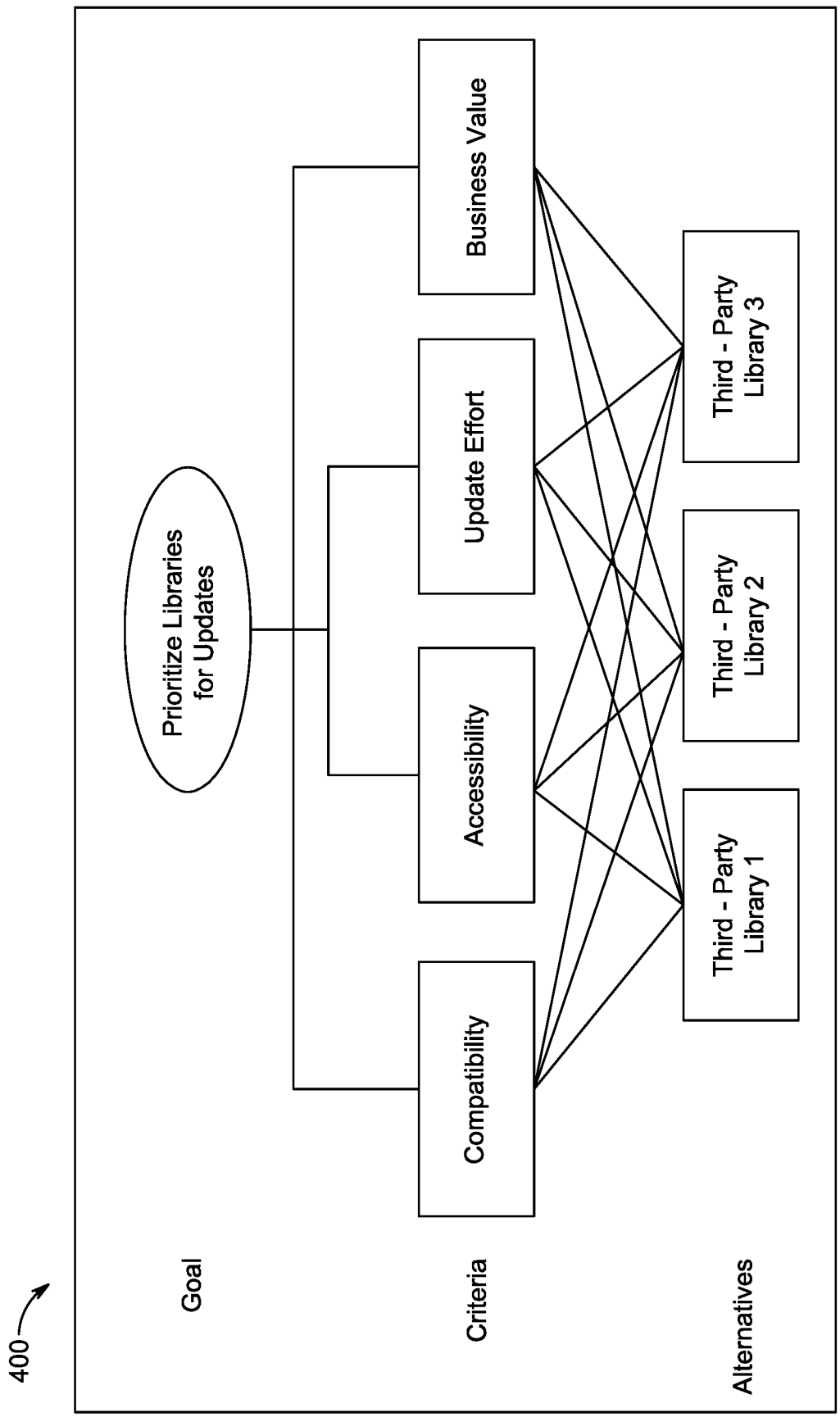
FIG. 4 depicts an example of an analytic hierarchy process, according to certain embodiments.

FIG. 4 depicts an example 400 of the analytic hierarchy process, according to certain embodiments. The analytic hierarchy process is based on a hierarchical structure as shown in FIG. 4. The hierarchical structure includes three levels, namely a first level, a second level, and a third level. The first level includes a main goal (for example, to prioritize third-party libraries for updates), the second level includes criteria (for example, criteria including compatibility criteria, accessibility criteria, update effort criteria, and business value criteria), and the third level includes third-party libraries (such as third-party library 1, third-party library 2, and third-party library 3).

The analytic hierarchy process includes the consistency check mechanism. The consistency check mechanism allows pairwise comparison between criteria to select the important values among them and then calculate the consistency index and ratio to validate the generated weights. Table 6 provided below presents the important value proposed by the analytic hierarchy process. For example, the important value between compatibility and accessibility can be 5, which means compatibility is 5 times more important than accessibility.

TABLE 6

Importance values for analytic hierarchy process

| Importance | Definition | Explanation |
|---|---|---|
| 1 | Equal Importance | Two activities contribute equally to the objective |
| 3 | Moderate Importance | Experience and judgment slightly favor one activity over another |
| 5 | Strong Importance | Experience and judgment strongly favor one activity over another |
| 7 | Demonstrated Importance | An activity is favored very strongly over another |
| 9 | Extreme Importance | The evidence favoring one activity over another is of the highest possible order of affirmation |
| 2, 4, 6, 8 | Intermediate Importance Values | |

Table 7 provided below shows an example of the importance of the values for the four criteria including the compatibility criteria, the accessibility criteria, the update effort criteria, and the business value criteria.

TABLE 7

Example of the Importance of the criteria values

| | Compatibility | Accessibility | Update Effort | Business Value |
|---|---|---|---|---|
| Compatibility | 1 | 3 | 2 | 1 |
| Accessibility | 1/3 | 1 | 1/2 | 1/3 |
| Update Effort | 1/2 | 2 | 1 | 1 |
| Business Value | 1 | 3 | 1 | 1 |
| Sum | 2.83 | 9 | 4.5 | 3.33 |

After selecting the importance values, the values may be normalized by dividing each value by its column's sum. Table 8 shows the normalized importance values.

TABLE 8

Normalized Importance Values

| | Compatibility | Accessibility | Update Effort | Business Value |
|---|---|---|---|---|
| Compatibility | 0.35 | 0.33 | 0.44 | 0.3 |
| Accessibility | 0.12 | 0.11 | 0.11 | 0.1 |
| Update Effort | 0.18 | 0.22 | 0.22 | 0.3 |
| Business Value | 0.35 | 0.33 | 0.22 | 0.3 |

After normalization, each criterion's weight may be calculated by taking the average of its row as follows:

$$\text{Compatibility Weight} = \frac{0.35 + 0.33 + 044 + 0.3}{4} = 0.35 \quad (5)$$

$$\text{Accessibility Weight} = \frac{0.12 + 0.11 + 0.11 + 0.1}{4} = 0.11 \quad (6)$$

$$\text{Update Effort Weight} = \frac{0.18 + 0.22 + 0.22 + 0.3}{4} = 0.23 \quad (7)$$

$$\text{Business Value Weight} = \frac{0.35 + 0.33 + 0.22 + 0.3}{4} = 0.3 \quad (8)$$

To calculate $\lambda_{max}$, the sum of the weights for each row may be calculated and then divided by its weight, as shown in Table 9.

TABLE 9

Weights Sum

| | Compatibility | Accessibility | Update Effort | Business Value | Weights Sum | Weights Sum/Weight |
|---|---|---|---|---|---|---|
| Weights | 0.35 | 0.11 | 0.23 | 0.3 | | |
| Compatibility | 0.35 | 0.33 | 0.46 | 0.3 | 1.44 | 4.11 |
| Accessibility | 0.116 | 0.11 | 0.115 | 0.1 | 0.441 | 4.009 |
| Update Effort | 0.17 | 0.22 | 0.23 | 0.3 | 0.92 | 4 |
| Business Value | 0.35 | 0.33 | 0.23 | 0.3 | 1.21 | 4.03 |

To obtain the $\lambda_{max}$, the average of the last column may be calculated as follows.

$$\lambda_{max} = \frac{4.11 + 4.009 + 4 + 4.03}{4} = 4.037 \quad (9)$$

After that, the consistency index may be calculated using Equation 10, where "n" is the number of criteria. Lastly, to measure the consistency ratio, the consistency index may be divided by the random index, as shown in Equation 11. The random index may be obtained from analytic hierarchy process based on the number of criteria (for example, 4) as presented in Table 10. The last step is to check the consistency ratio. If the consistency ratio is greater than 10%, then the weights are not valid. Therefore, reassignments of importance values shall be done to generate valid weights. In an example, the consistency ratio is 0.0137, which means the weights are valid.

$$\text{Consistency Index } (CI) = \frac{\lambda_{max} - n}{n - 1} \quad (10)$$

$$\text{Consistency Index } (CI) = \frac{4.037 - 4}{4 - 1} = 0.0124 \quad (11)$$

-continued $$\text{Consistency Ratio } (CR) = \frac{\text{Consistency Index}}{\text{Random Index}} \quad (12)$$

$$\text{Consistency Ratio } (CR) = \frac{0.0124}{0.9} = 0.0137 \quad (13)$$

TABLE 10

Random Index

| n | 1 | 2 | 3 | 4 | 5 | 6 | 7 | 8 | 9 | 10 |
|---|---|---|---|---|---|---|---|---|---|---|
| Random Consistency Index | 0 | 0 | 0.58 | 0.90 | 1.12 | 1.24 | 1.32 | 1.41 | 1.45 | 1.49 |

Referring again to FIG. 1, according to an implementation, the processing circuitry 106 may compute, for each third-party library of the plurality of third-party libraries, a ranking value of the third-party library using the set of third-party library metrics and the weight. In an example, the processing circuitry 106 may compute the ranking value using simple additive weighting. In an implementation, the ranking values may be computed using Equation (14) provided below.

$$\text{priority}_i = \sum_{i=1}^{m} w_j r_{ij}, \quad (14)$$

where, priority$_i$ represents a ranking value for $i^{th}$ third-party library, w$_j$ represents weight for $j^{th}$ criteria, and $r_{ij}$ represents a rating value for the $i^{th}$ third-party library based on $j^{th}$ criteria. An example of how simple additive weighting works in described in Table 11 provided below.

TABLE 11

Simple additive weighting example

| Criteria\Third-party library | Compatibility w = 0.3 | Accessibility w = 0.2 | Update Effort w = 0.25 | Business Value w = 0.25 | Result | Priority |
|---|---|---|---|---|---|---|
| Third-party library A | 60% | 70% | 75% | 80% | 70.75% | 1 |
| Third-party library B | 40% | 50% | 55% | 60% | 50.75% | 3 |
| Third-party library C | 65% | 50% | 70% | 60% | 62% | 2 |

Figure 5:
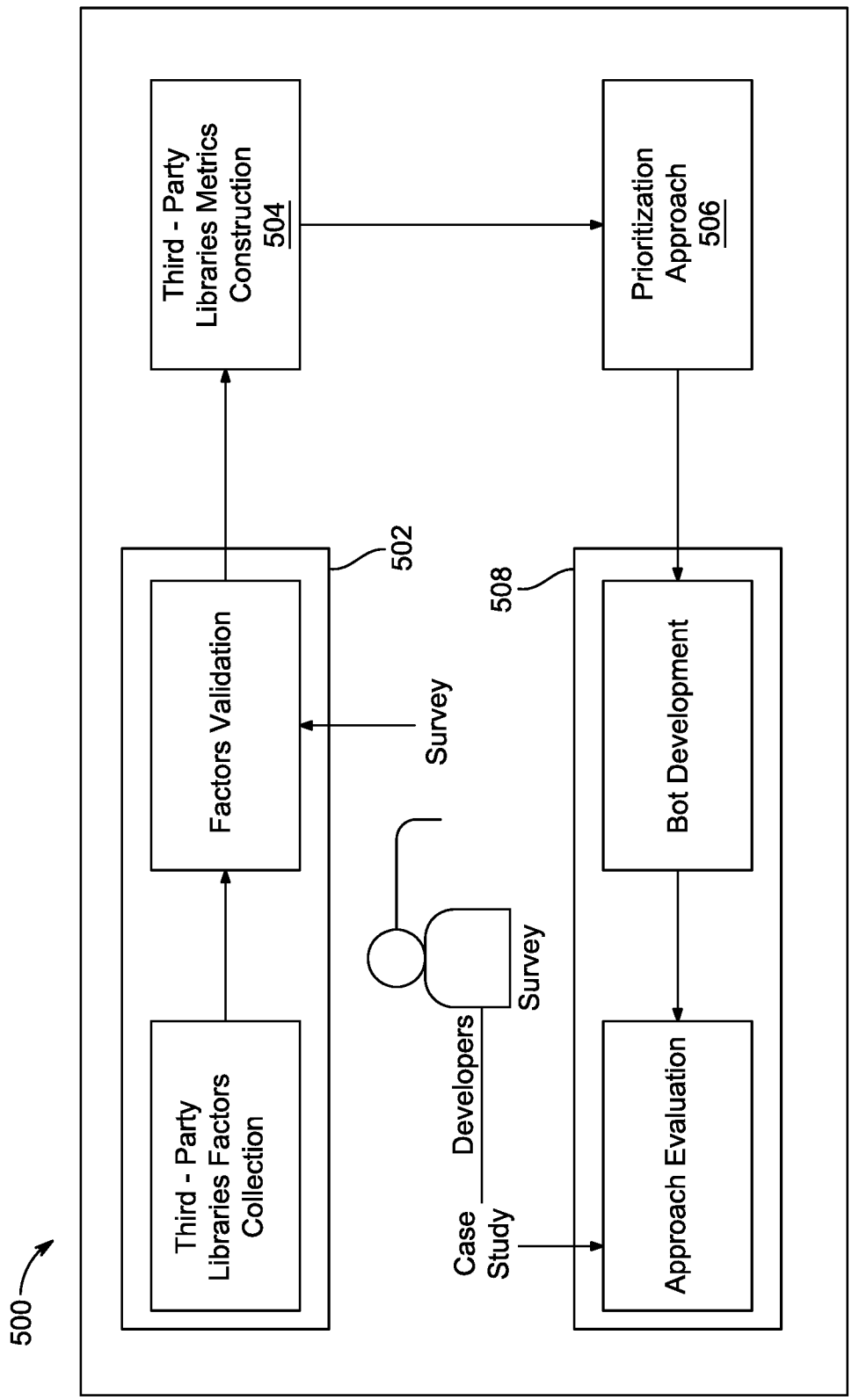
FIG. 5 depicts an example of an overall development flow of the present disclosure, according to certain embodiments.

FIG. 5 depicts an example 500 of an overall development flow of the present disclosure, according to certain embodiments.

As described in FIG. 5, the development flow includes various phases including a third-party libraries factors collection and validation phase 502, a third-party libraries metrics construction phase 504, a prioritization approach phase 506, a software chatbot development and evaluation phase 508.

The third-party libraries factors collection and validation phase 502 involves studying third-party libraries update behavior and analyzing its main factors. In an example, a set of factors may be collected and grouped into five categories, namely compatibility, accessibility, update effort, business value, and security. As shown in Table 12 (provided below), each category is listed with its factors and the rationale behind selecting those factors. After collecting and refining those factors, a survey is conducted with a group of mobile application developers to confirm and validate the following factors.

TABLE 12

Third-party libraries criteria and factors

| Criteria | Factor | Rationale |
|---|---|---|
| Compatibility | Breaking Changes | The existence of breaking changes between library releases decrease compatibility. |
| | Reported Issues | The existence of reported issues by the library consumers decreases compatibility. |
| | Update Delay | The larger the gap between the currently installed library release and the other release, lower the compatibility. |
| | License Incompatibility | Changing the license between library releases may bring conflict to the current project license |
| | Source Code Test | The availability of the library's source code test (e.g., JUnit) in the new release might lead to higher compatibility. |
| Accessibility | Contribution Status | The availability of the library's contribution (in terms of commits/pull requests/number of contributors) leads to higher accessibility. |
| Update Effort | Source Code Complexity | The larger the library's source code complexity (e.g., McCabe Cyclomatic) is, the higher the update effort might be. |
| | Update Size | The larger the update size (e.g., source code size) is between the currently used library release and the other release, the higher the update effort might be. |
| | Library Usage | The larger the app consumes from the library, the higher the update effort might be. |
| | Maintainers Responses | The availability of the library's maintainer's responses on the library's official web page, e.g., GitHub, in terms of closing issues leads to lower update effort |
| | Documentation Evaluation | The clearer the library's new documentation (if any) is the lower the update effort might be. |
| | System Files Stability | The higher the system stability (in terms of methods/files modification between releases), the lower the update effort might be. |
| | Community Support | The availability of the community support (e.g., Stack Overflow Forum) to the library leads to lower update effort. |
| Business Value | App's Reviews | The availability of app reviews that are related to a specific category (e.g., GUI) might increase the business value of libraries in the same category. |
| | Official Minimum Platform Support | If the library requires an increase in the official minimum platform support (e.g., SDK version), then it might decrease the library's business value. |
| | New Features | The availability of the library's new features might increase the library's business value. |
| Security | Discovered Vulnerabilities | The availability of security threats (vulnerabilities) related to the library leads to lower security. |
| | Unnecessary Permissions | The availability of security unnecessary permissions in the library's new release leads to lower security. |

After collecting related factors to third-party libraries update process and conducting a validation survey on those factors, the survey results are analyzed to confirm which more favorable factors are to the industry practitioners and vice versa. Thereafter, the possibility of proposing metrics for those factors and the applicability of implementing them later on in the chatbot is checked. After making a short list of considered factors, a set of metrics are grouped into five criteria (categories), namely compatibility, accessibility, update effort, business value, and security. Finally, the proposed metrics are validated. Four properties must be satisfied in order to be a valid metric.

After proposing a set of metrics and groping them into five criteria, simple additive weighting and analytic hierarchy process are utilized to build a prioritization model. Initially, for each one of the four criteria (compatibility, accessibility, update effort, and business value), aggregated metrics is calculated that measure the average of all factors' values for that criterion. For example, the compatibility criterion metric is the average of developers' unsatisfaction, update delay, and breaking changes. However, for security, since it is a combination of real numbers (vulnerabilities and unnecessary permissions) instead of percentages as other factors, it is handled separately. In case a third-party library has security threats, then it may be given higher priority compared to other third-party libraries. For prioritization, initially, compatibility, accessibility, update effort, and business value criteria values are calculated for each third-party library. Then, the analytic hierarchy process is utilized to generate weight for each criterion. The analytic hierarchy process is used for a consistency checking mechanism to ensure that the generated weights are valid by ignoring the weights if the consistency ratio is above 10%. After that, the simple additive weighting method is employed to multiply each criteria value by its weight (obtained from the analytic hierarchy process) and those values are summed to generate a ranking value for each third-party library. Finally, the ranking value is used to prioritize third-party libraries updates in the mobile application.

In an exemplary implementation, a support tool is a software chatbot. The implementation includes a development and evaluation phase 508. To automate the process of third-party libraries updates prioritization, the chatbot is developed to handle the approach. An evaluation case study is performed that matches real-life scenarios.

To understand third-party libraries update practice in the industry, an anonymous online survey is carried out with mobile application developers that investigate the update behavior they follow while making update decisions for third-party libraries in their applications. The objective of the survey is to validate a set of criteria and factors that are collected that relate to the updated practice and understand to what extent mobile application developers agree or disagree with them.

A different set of question types in the survey are used that aimed to collect useful data and insights. Multiple choice (MCQ), short answers, and open-ended and ranking questions are employed. However, MCQ is mainly considered. The first section of the survey discussed developer-related experiences such as years of experience, targeted platform (Android/iOS), development environment (Native/Hybrid), and others. The second section contained questions about the behavior of third-party libraries in mobile applications in terms of what developers consider when making update decisions or what they ignore. Those are MCQ-based questions (except one with a sub-question) with five choices "Always", "Often", "Sometimes", "Rarely", and "Never". In the analysis, the first two are combined as "Yes", and the last as "No" to simplify the results. The last section targets general questions about criteria, factors, and prioritization habits that developers employ while updating third-party libraries in their applications.

The survey is spread mainly to two levels of projects and individuals. For projects, a set of open-source mobile applications on GitHub is selected and reached out to their contributors via their public emails. To reach out to individuals, GitHub for users who identified themselves as mobile, Android, or iOS developers is manually searched. As a result, 280 emails are sent on the project levels and 232 emails are sent to individuals, and they are asked to forward the survey to their colleagues. Table 13 shows statistics about the projects included in the survey. The reason that the survey is divided into two levels is to guarantee that the survey is reached out to the developers who worked on real and public application. Hence, the answers can be obtained from experienced developers.

First, after initially drafting the questions, the questions are reviewed multiple times and sent to three senior software developers (all of them have mobile application development experience) to obtain their notes and change the survey accordingly. Additionally, a clear objective paragraph is provided at the beginning of the survey to eliminate confusion. During the selection process, developers who clearly identified themselves as mobile developers are selected to make sure they are still available in the domain. Lastly, unreasonable answers from the responses are discarded.

TABLE 13

Projects Statistics

| Number of Projects | 21 |
|---|---|
| Total Number of Downloads | ~33 million |
| Average Number of Downloads | ~1.6 million |
| Total Number of Contributors | ~1400 |
| Average Number of Contributors | ~70 |

Figure 6:
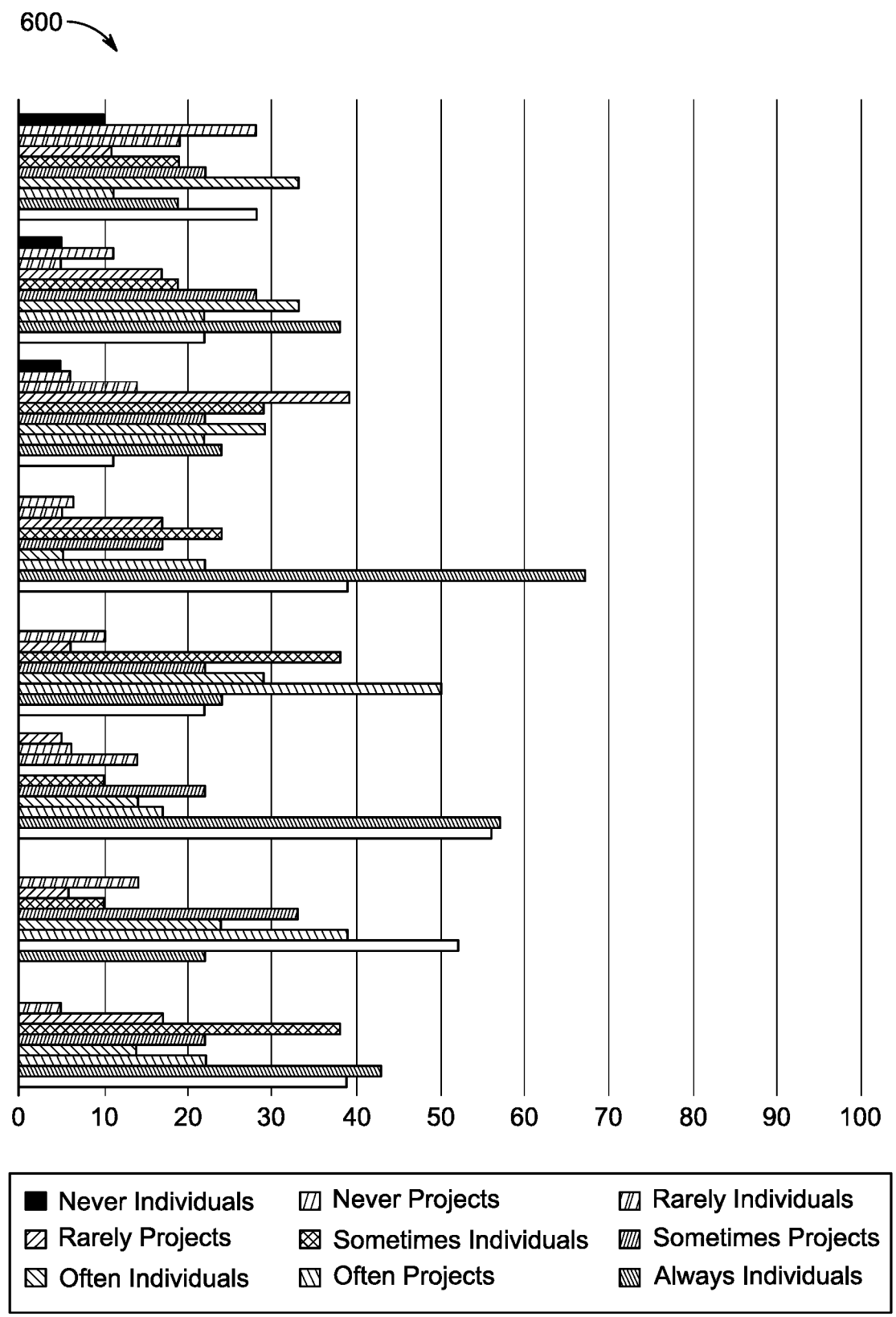
FIG. 6 depicts an example of top considered factors for third-party libraries update decisions, according to certain embodiments.

FIG. 6 depicts an example 600 of top considered factors for third-party libraries update decisions, according to certain embodiments.

As shown in FIG. 6, some of the factors considered for third-party libraries update decisions are "Never Individuals", "Never Projects", "Rarely Individuals", "Rarely Projects", "Sometimes Individuals", "Sometimes Projects", "Often Individuals", "Often Projects", and "Always Individuals".

Developers' experience summary is described in Table 14 provided below.

TABLE 14

Projects Statistics

| | Project Level | | | Individual Level | | |
|---|---|---|---|---|---|---|
| Years of Experience | 1~5 72% | 6~10 22% | 10< 6% | 1~5 48% | 6~10 48% | 10< 5% |
| Development Platform | Android 78% | iOS 0% | Both 22% | Android 57% | iOS 14% | Both 29% |
| Development Environment | Native 61% | Hybrid 6% | Both 33% | Native 90% | Hybrid 0% | Both 10% |
| Installed third party libraries | 1~10 67% | 11~20 11% | 20< 22% | 1~10 48% | 11~20 38% | 20< 14% |
| Considering Libraries Prioritization as a Challenging Task | Yes 72% | | No 28% | Yes 62% | | No 38% |

As shown in Table 14, 60% of the developers have 1~5 years of experience, whereas 35% and 5.5% have 6~10 and higher than 10 years of experience, respectively. The majority of the developers are working with Android (67.5%), 7% are iOS developers, and 25.5% are working with both platforms. Moreover, 75.5% are native developers, 3% hybrid, and 21.5% both. It was found that 57.5% of developers use 1~5 third-party libraries in their projects, while 24.5% and 18% use 10~20 and higher than 20 third-party libraries, respectively. Finally, 67% of the participants consider third-party libraries prioritization as a challenging task. For developers' experience results, the average between projects and individuals' levels have been reported.

It was found that compatibility, breaking changes, requesting unnecessary permission(s), forcing minimum SDK increase, library's new features, known vulnerabilities, newly reported issues, and library contribution status are among the top factors developers consider while updating third-party libraries in their applications, based on Always and Often responses above 50% as shown in FIG. 6. While projects and individuals' responses agreed on most of the top considered factors, it has been found that few of them have been favorable to individuals. Checking third-party libraries against known vulnerabilities and updating the library accordingly have been selected by 71% and 44% of individuals and project levels, respectively. Also, library contribution status was reported 52% by individuals compared to 39% on the projects level. Similarly, checking newly reported issues have been selected by 53% and 33% of individuals and project levels, respectively. Although the results show a small difference in some questions (factors), generally, there is a consensus of factors that developers take into consideration while updating third-party libraries. The most important factors for both projects and individuals' levels are recorded as follows. First, checking for unnecessary permission(s) by 73% and 71% for projects and individuals, respectively. Second, checking for declared compatibility issues was selected by 61% and 76% for projects and individuals, respectively. Third, SDK increase was selected by 61% and 72% for projects and individuals, respectively. Fourth, checking against breaking changes between library releases was considered by 61% and 57% for projects and individuals, respectively. Lastly, checking newly added features in the library was considered by 72% and 53%.

Figure 7:
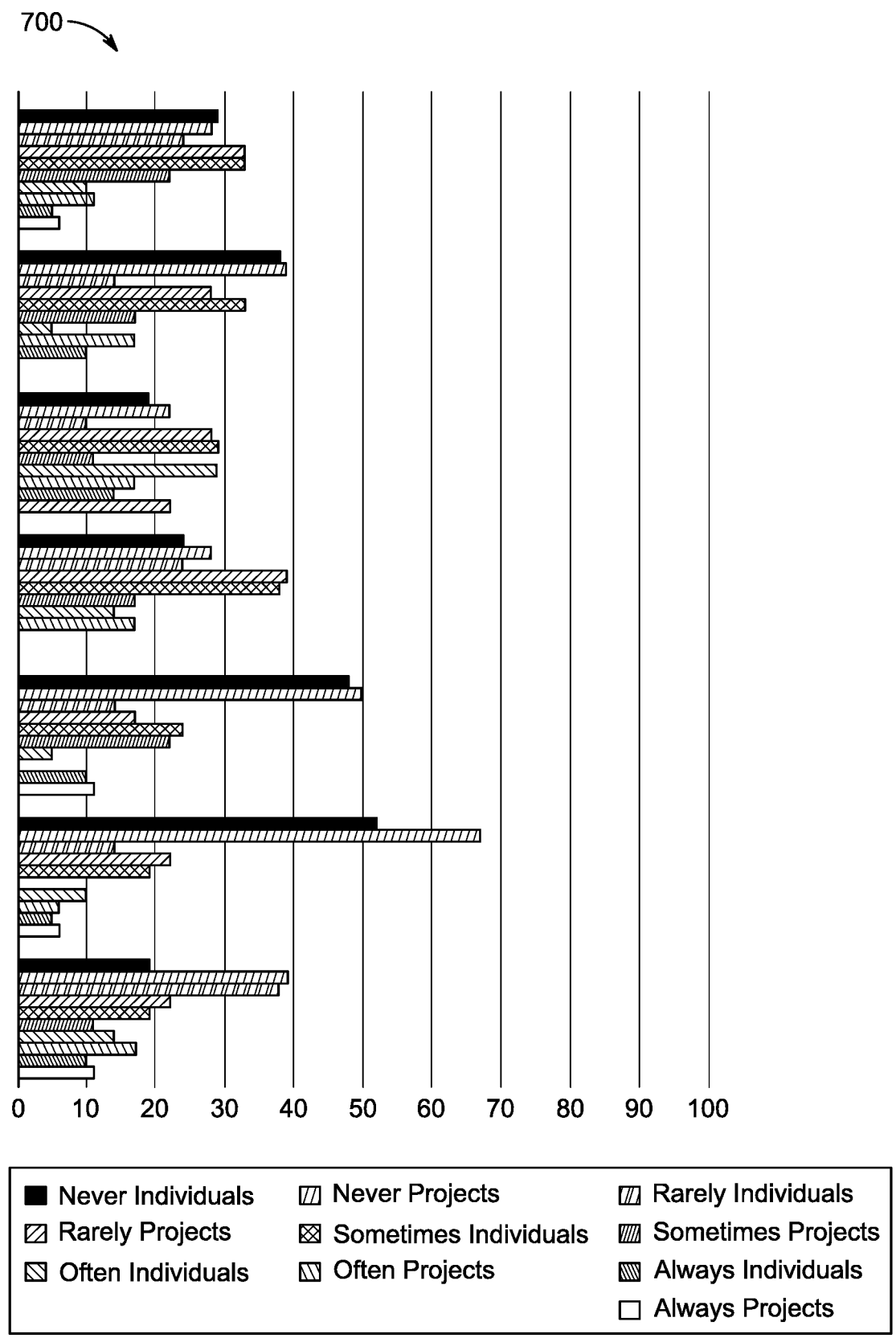
FIG. 7 depicts an example of least considered factors for third-party libraries update decisions, according to certain embodiments.

On the other hand, it was found that seven (7) factors are mainly ignored (having rarely and never 50% or above) by the developers when making update decisions, as shown in FIG. 7. FIG. 7 depicts an example 700 of least considered factors for third-party libraries update decisions, according to certain embodiments.

As shown in FIG. 7, some of the factors considered for third-party libraries update decisions are "Never Individuals", "Never Projects", "Rarely Individuals", "Rarely Projects", "Sometimes Individuals", "Sometimes Projects", "Often Individuals", "Often Projects", and "Always Individuals", and "Always Projects".

The source code complexity between library releases was the most ignored factor with 89% and 66% by projects level and individuals, respectively. Then, checking library update size, source code stability, and library usage in the app have been selected by 67% and by 62%, 52%, and 48% of individuals, respectively. Moreover, checking library's license incompatibility between versions and checking the availability of library source code tests (e.g., JUnit) have been considered by 61% at the projects' level and by 57%, and 53% at the individuals' level, respectively. Finally, 50% of project responses ignore library maintainers' responses rate in bug tracking systems. However, 29% of the individuals ignore that.

Moreover, it was found that four factors were selected mainly as neutral (Sometimes) while updating third-party libraries. Update delay (number of releases between current and last release) and checking library community support have been selected by 33% at the projects level and 48%, and 33% at the individuals' level, respectively. Another two factors that have been equally considered at the project level by 28% are App reviews on the store and library documentation usefulness, whereas, at the individuals' level, they achieved 38% and 24%, respectively.

Thereafter, ranking and open questions, as shown in Table 15, to investigate third-party libraries update process. It was found that 20 responses consider their application reviews as a motivation for updating third-party libraries, 15 of which are interested in reviews that are bug discovery, and 8 responses are interested in feature requests reviews. In another similar question, it was asked what factors developers consider during the update process. 14 out of 19 responses showed interest in bug fixes, 4 responses explicitly stated security fixes, and 9 responses showed interest in the library's new features.

TABLE 15

Survey Open Questions

| Question | Responses |
| --- | --- |
| Rank the following criteria based on your priority when making third-party library update decisions? Security, Business Value, Update Effort, Compatibility | 39 |
| If you consider other criteria, please specify them? e.g., Library Documentation Usefulness | 3 |
| What factors do you consider the most when making an update decision, e.g., New Features/Fixed Bugs in the Library, Library Community Support, Release Frequency . . . etc .? | 19 |
| What do you recommend to be considered in a tool that targets better management and prioritization of third-party library updates in your mobile app? | 10 |

In conclusion, 67% of the participants consider the prioritization of third-party libraries in their application as a challenging task. It was found that compatibility and security-related factors are important to the developers. Further, it was determined that developers ignore update size, source code complexity, stability, library license incompatibility, and the availability of software tests. The majority of the ignored factors are related to the library's source code. The developers may not be aware of some important factors related to third-party libraries, such as update delay and the library's community support.

As previously illustrated, the approach for the present disclosure starts from a set of third-party library metrics grouped under five categories, namely compatibility, accessibility, update effort, business value, and security. After obtaining criteria values, the analytic hierarchy process can be used to generate weights for the first four criteria. Then, the simple additive weighting is employed to generate ranking values for each third-party library. The ranking values are used to prioritize third-party libraries for updates. However, security criteria is considered a high priority. In one embodiment, if a third-party library has any vulnerability or unnecessary permissions, the highest priority can be obtained in that order. An exemplary implementation is a chatbot. In one embodiment, an implementation is for Android mobile applications. However, the metrics and the prioritization methods are applicable to other platforms as well with some modifications.

Figure 8:
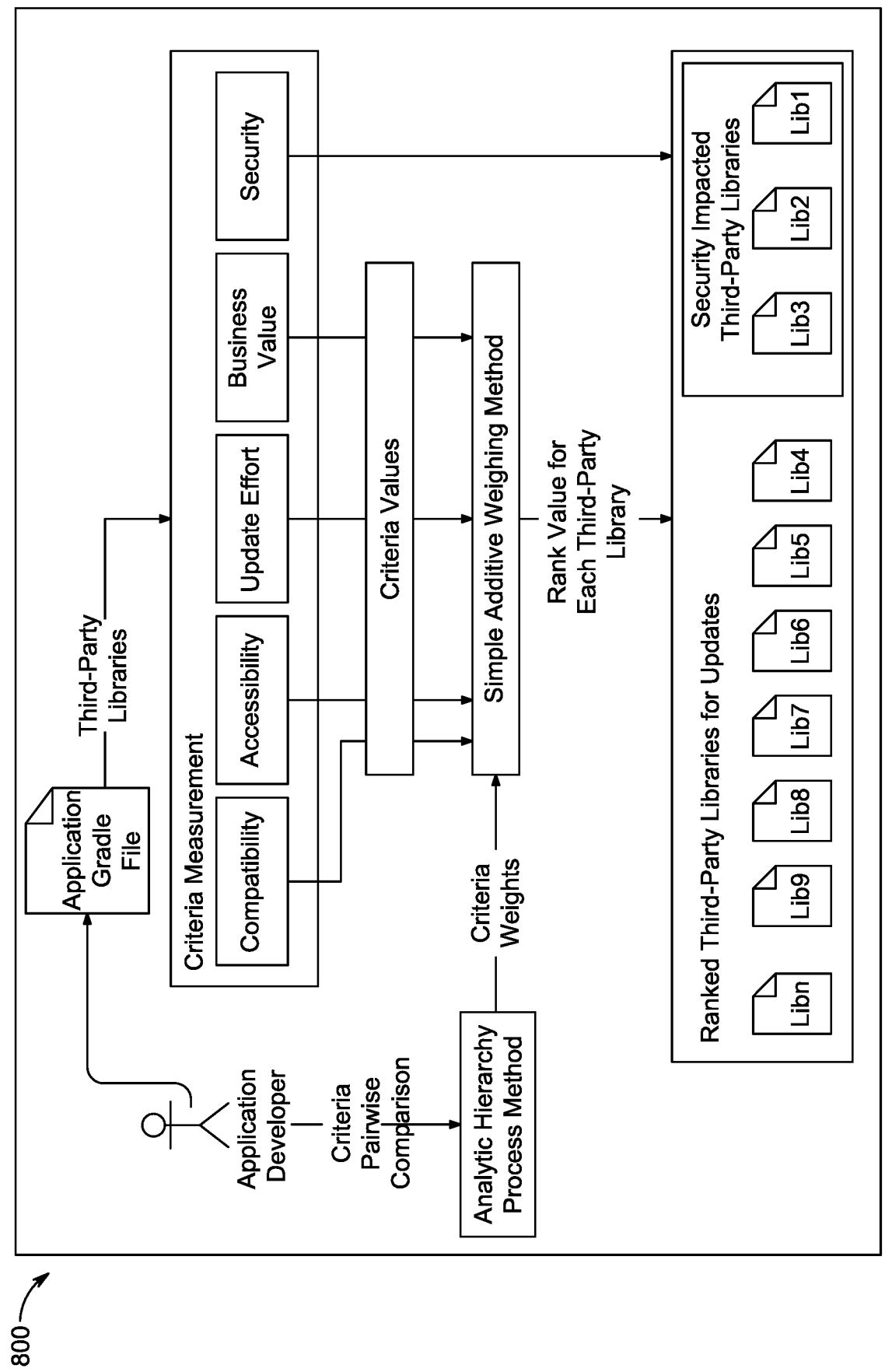
FIG. 8 illustrates an overview of an approach of the present disclosure, according to certain embodiments.

FIG. 8 illustrates an overview 800 of an approach of the present disclosure, according to certain embodiments.

As shown in FIG. 8, an application gradle file is read. The application gradle file is a file in Android applications that holds the list of installed third-party libraries. An example of the application gradle file is provided below.

```
apply plugin:    'com.android.application'
android {
    compileSdkVersion 30
    buildToolsVersion "30.0.3"
    defaultConfig {
        applicationId " "
        minSdkVersion 21
        targetSdkVersion 32
    }
    buildTypes {
        release {
            minifyEnabled    false
            proguardFiles    getDefaultProguardFile ('proguard-android.txt')
        }
    }
}
dependencies {
    implementation 'com.google.android.material:material:1.3.0'
    implementation 'androidx.appcompat:appcompat:1.2.0'
    implementation 'androidx.legacy: legacy-support-v4:1.0.0'
    implementation 'androidx. recyclerview: recyclerview: 1.2.1'
    implementation 'androidx. cardview: cardview: 1.0.0'
    implementation 'androidx. palette: palatte: 1.0.0'
    implementation 'com.github.bumptech.glide:glide: 3.7.0'
    implementation 'com. squareup. picasso: picasso: 2.5.2'
    implementation 'com.wang.avi:library:1.0.5'
    implementation 'com.flaviofaria:kenburnsview:1.0.7'
    implementation 'com.google.code.gson:gson:2.8.5'
    implementation 'com. nineoldandroids:library:2.4.0'
    implementation 'ch.acra:acra:4.8.5'
    implementation 'com.github.PhilJay:MPAndroidChart:v3.0.2'
}
```

In an exemplary implementation, the application gradle file may be parsed and third-party libraries may be extracted from it. After that, the chatbot may search for each library's GitHub repository using Libraries.io website as it lists most open-source libraries and their information e.g., GitHub. However, some libraries are not considered as the third party, such as those which are provided by the platform itself "androidx.", they are not considered. Then, each library's may be obtained from official releases from Maven website and it may be checked if the installed release number from the application gradle file is available in the official releases. Otherwise, the chatbot asks the user to select another release from the official list. This is referred to as process libraries confirmation step since it allows the user to ignore any library. At the end, the chatbot gets a list of considered third-party libraries for updates, and with each library, their GitHub and Maven ULRs.

Figure 9:
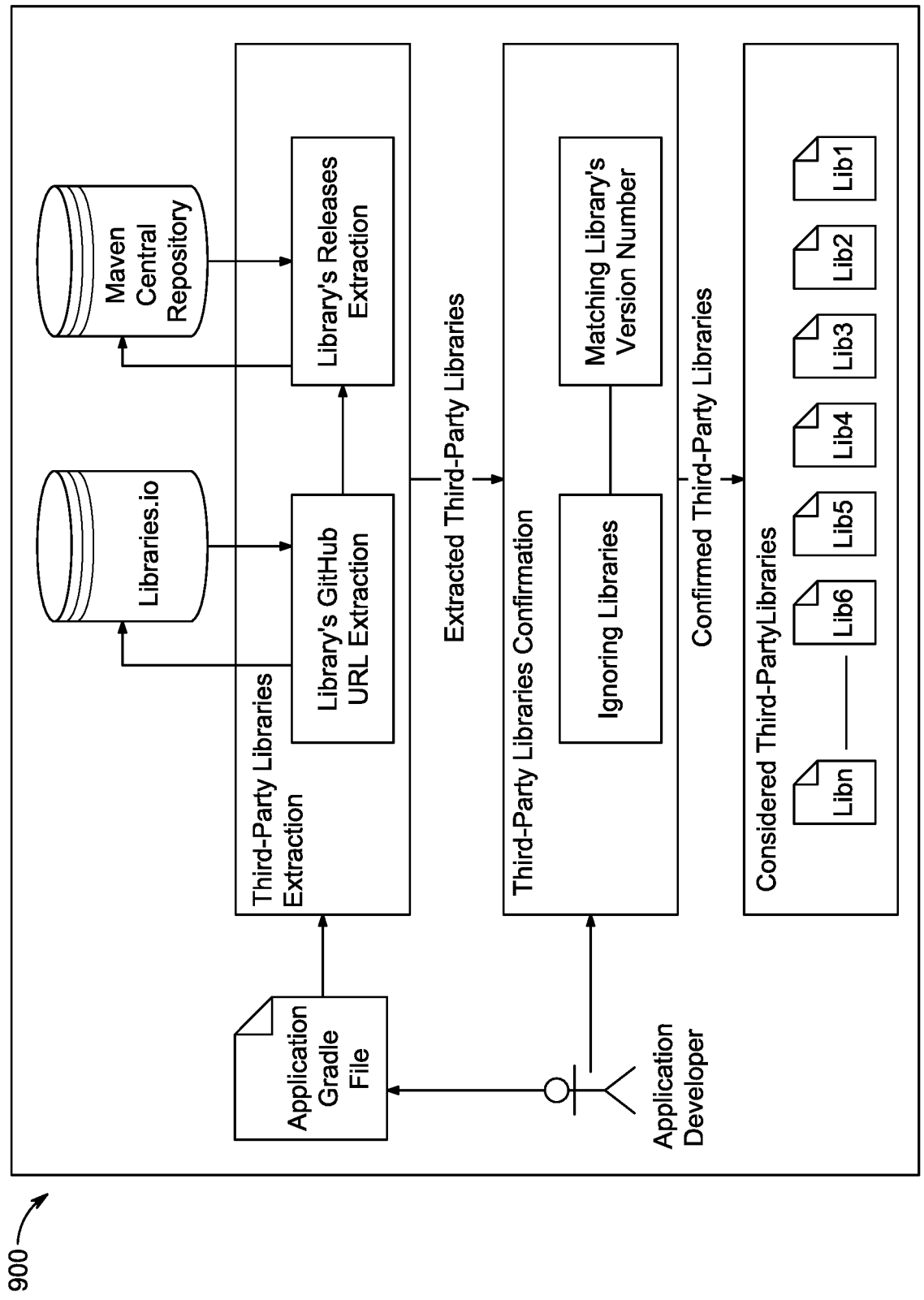
FIG. 9 illustrates an example of the process of library extraction and confirmation from the application gradle file, according to certain embodiments.

FIG. 9 illustrates an example 900 of the process of library extraction and confirmation from the application gradle file, according to certain embodiments.

According to an implementation, after the third-party libraries are extracted, the required resources may be collected to calculate the metrics. Initially, library jar files, aar files and release metadata may be downloaded from Maven website (an open-source build tool developed by The Apache Software Foundation, 1000 N West Street, Suite 1200, Wilmington, DE 19801, U.S.A.). This may be required to calculate SFS, MSS, UD, and UPC metrics as they depend on the source code of the library, except for UD which needs only released dates. In examples, RevAPI website tool may be used to check the difference between two Maven library releases. RevAPI tool shows the difference between two APIs in terms of changes and their severities. In an example, "BREAKING" and "POTENTIALLY_BREAKING" may be considered as breaking changes and others as non-breaking changes to calculate BCR metric.

Figure 10:
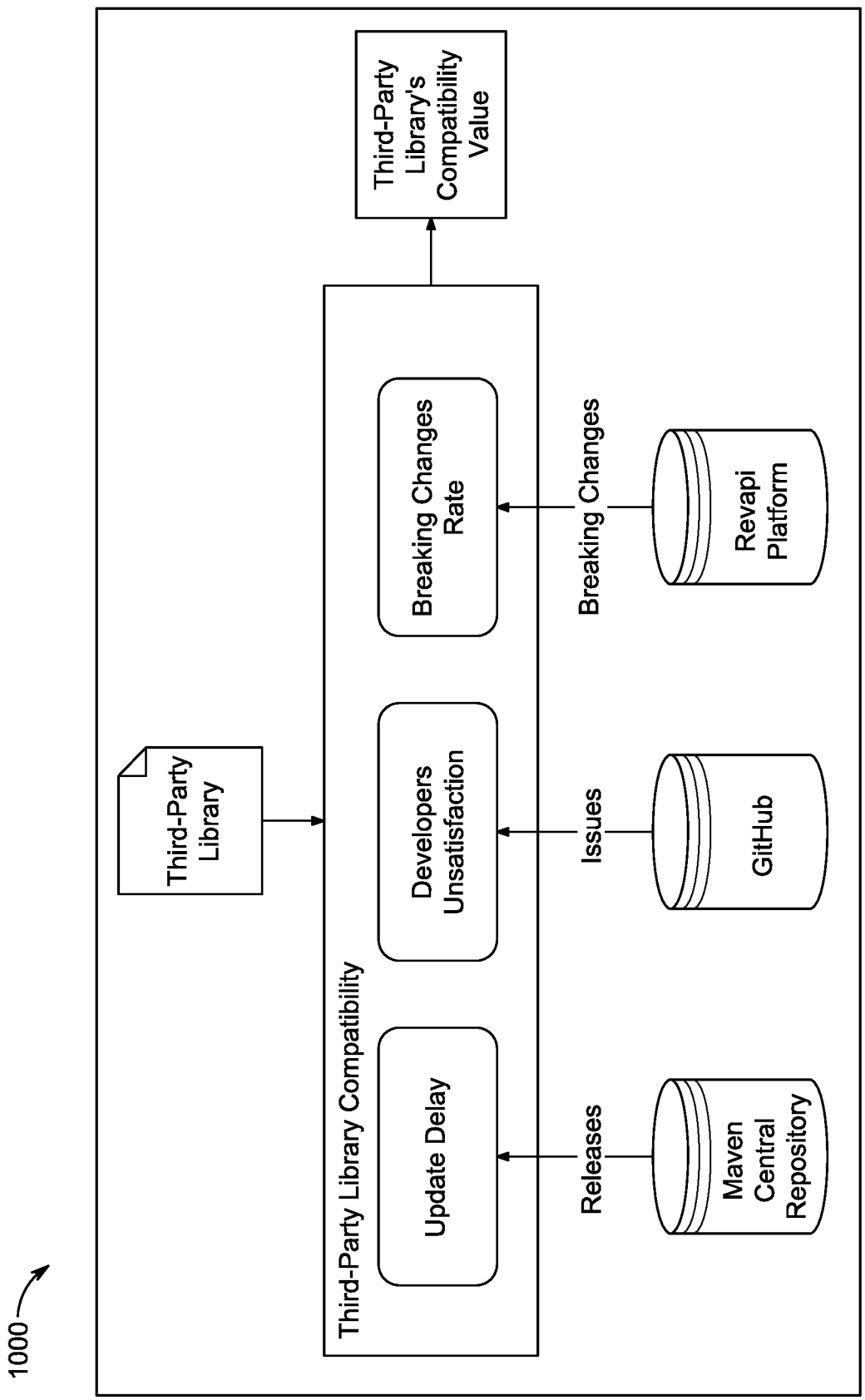
FIG. 10 illustrates a process of calculating compatibility metrics, according to certain embodiments.

FIG. 10 illustrates a process 1000 of calculating compatibility metrics, according to certain embodiments.

According to an exemplary implementation, to calculate metrics related to the library repository, such as DU, FR, PRR, PRMR, CR, ACR, and ICR, GitHub REST API may be employed to collect the required data. To calculate SPCR metric, Stack Overflow (which is a well-known public platform for technical questions) may be employed. For SFS metric, Zipdiff tool may be utilized to compare the source code of the library's two releases. It shows the added, modified, and deleted files between two jars files. In one embodiment, only the modified files are considered.

Figure 11:
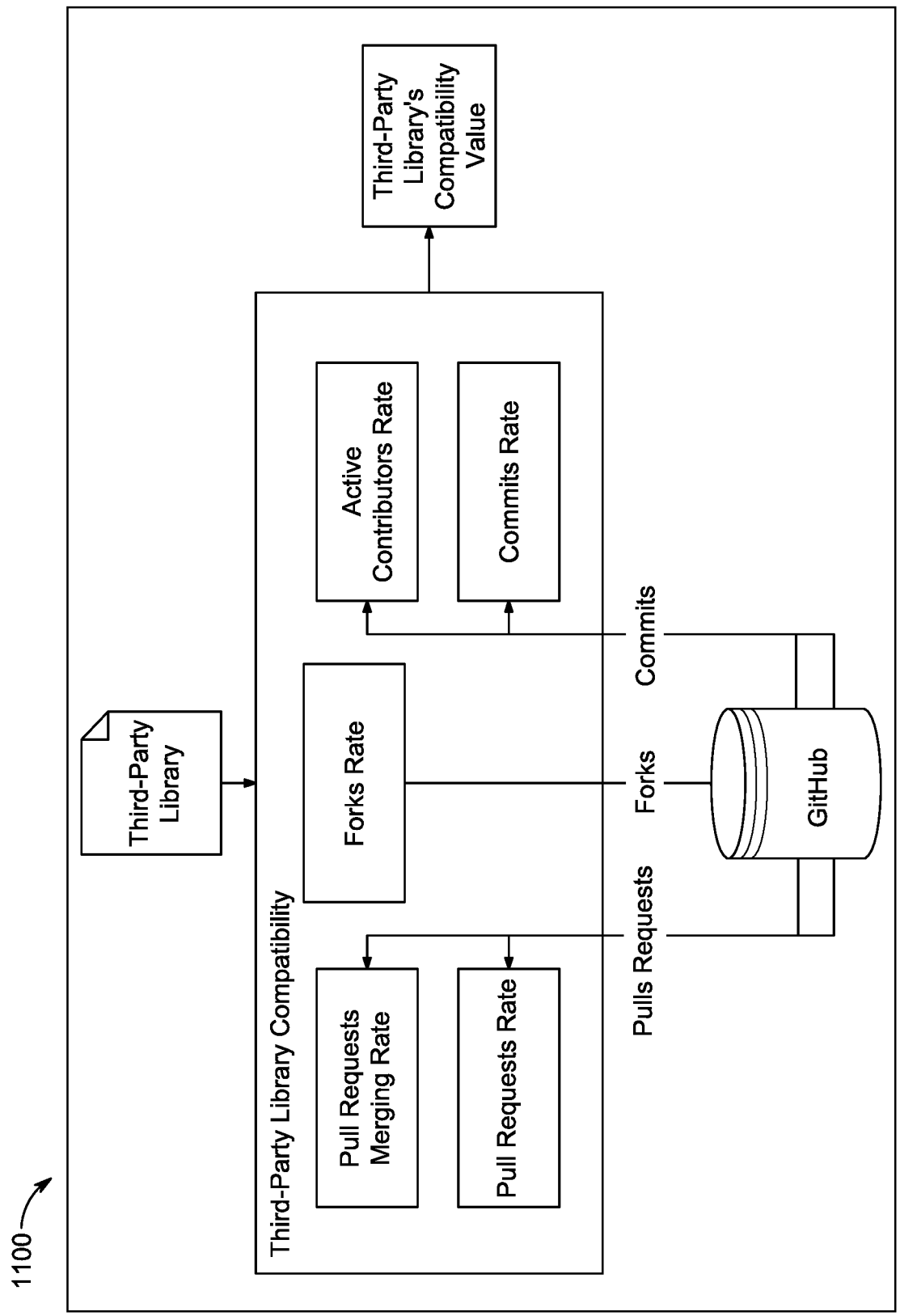
FIG. 11 shows an example of details of accessibility metric measurement, according to certain embodiments.
Figure 12:
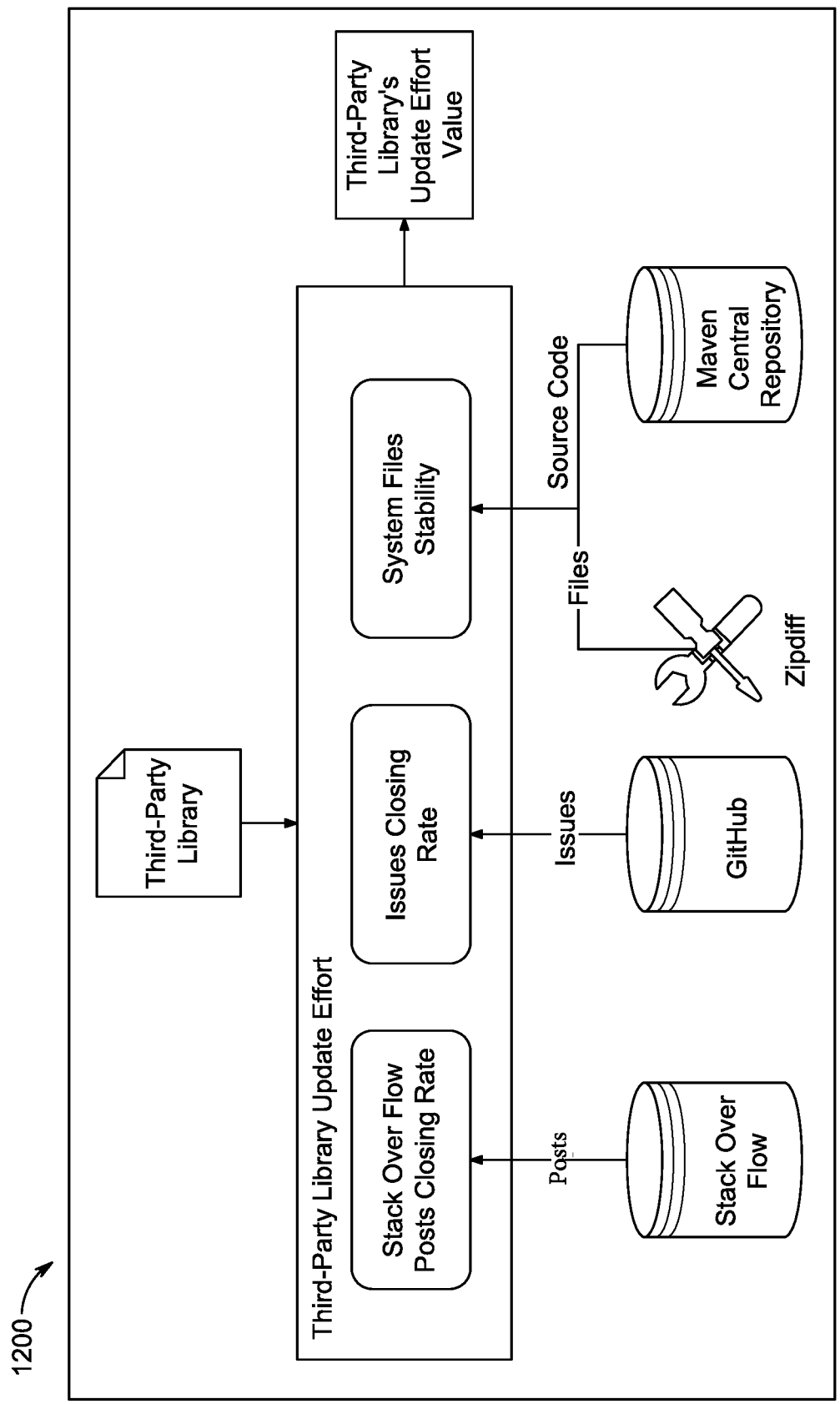
FIG. 12 shows an example of update effort measurement process, according to certain embodiments.

FIG. 11 shows an example 1100 of details of accessibility metric measurement, and FIG. 12 shows an example 1200 of update effort measurement process, according to certain embodiments.

Figure 13:
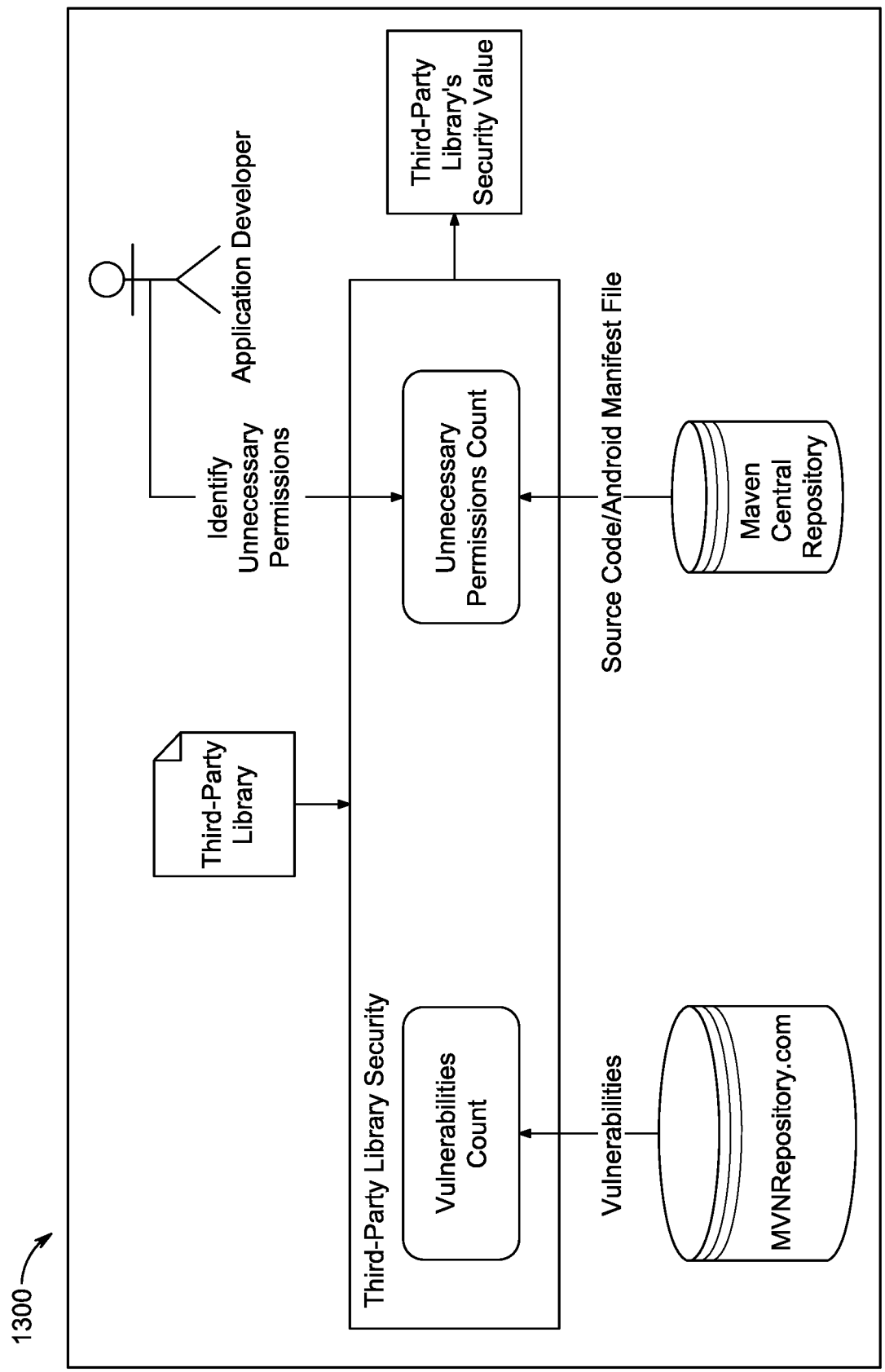
FIG. 13 describes an example of security measurement process, according to certain embodiments.
Figure 14:
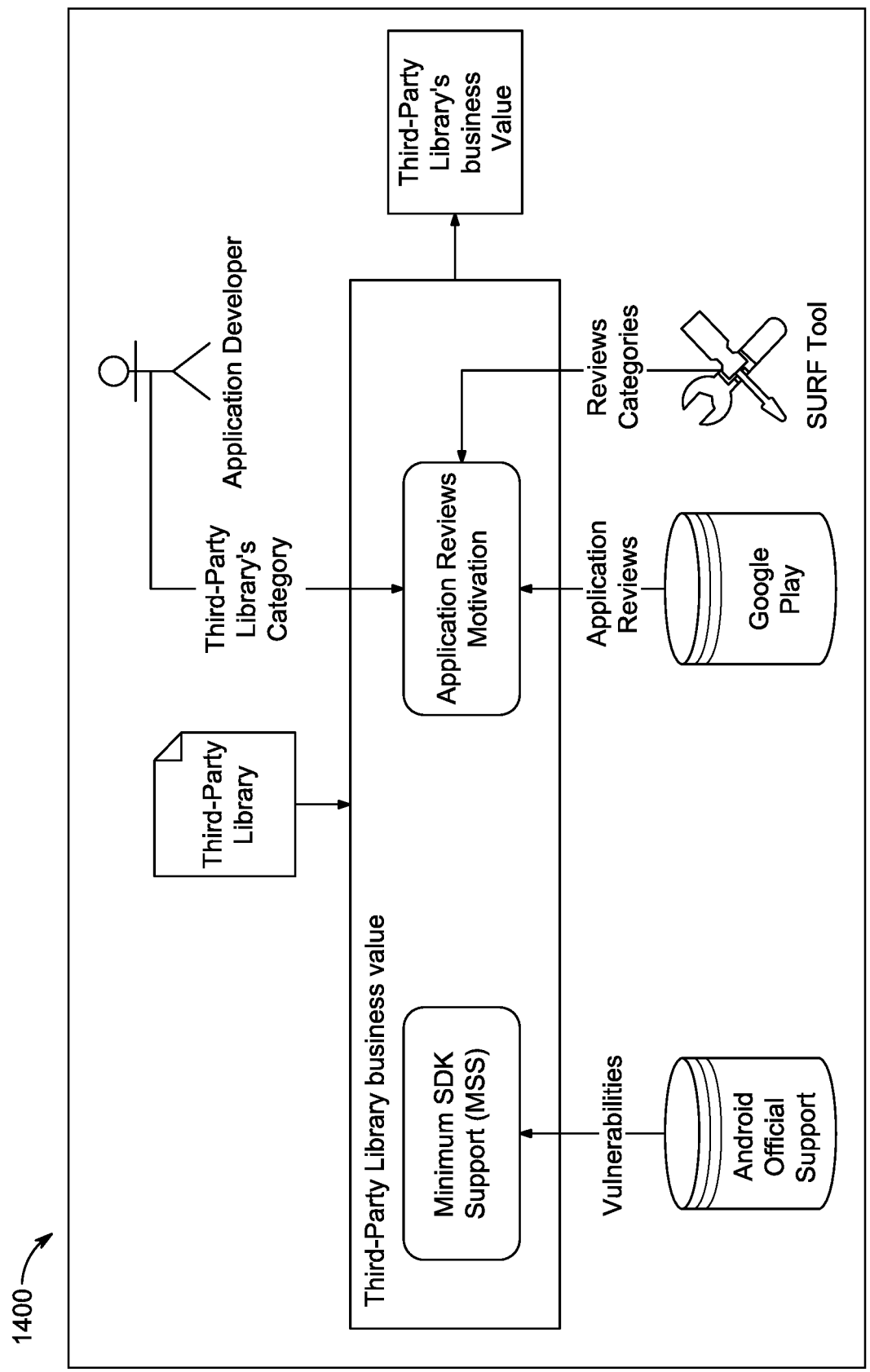
FIG. 14 describes an example of business value measurement process, according to certain embodiments.

According to an exemplary implementation, the MvnRepository website may be used to count the number of vulnerabilities for a particular library. To calculate MSS and UPC, the AndroidManifest.xml file may be parsed that is usually available in the library aar folder. In an example, it includes the minimum SDK version and required permissions. For MSS metric, the minimum SDK may be matched with the official Android Support as shown in Table 16 provided below. In an example, to calculate UPC, the current installed release's permissions may be matched with the new release's permissions. If any change is found, the chatbot may ask the user to detect if the new permission is considered unnecessary or not. FIG. 13 describes an example 1300 of security measurement process, according to certain embodiments. FIG. 14 describes an example 1400 of business value measurement process, according to certain embodiments.

TABLE 16

Android Official SDK Distribution from Android Studio

| Android Platform Version | API Level | Cumulative Distribution |
|---|---|---|
| 4.1 Jelly Bean | 16 | — |
| 4.2 Jelly Bean | 17 | 99.8% |
| 4.3 Jelly Bean | 18 | 99.5% |
| 4.4 KitKat | 19 | 99.4% |
| 5.0 Lollipop | 21 | 98.0% |
| 5.1 Lollipop | 22 | 97.3% |
| 6.0 Marshmallow | 23 | 94.1% |
| 7.0 Nougat | 24 | 89.0 |
| 7.1 Nougat | 25 | 85.6% |
| 8.0 Oreo | 26 | 82.7% |
| 8.1 Oreo | 27 | 78.7% |

TABLE 16-continued

Android Official SDK Distribution from Android Studio

| Android Platform Version | API Level | Cumulative Distribution |
|---|---|---|
| 9.0 Oreo | 28 | 69.0% |
| 10. Q | 29 | 50.8% |
| 11. R | 30 | 24.3% |

As shown in Table 16, ARM metric is based on the application's end-users' reviews. Hence, the chatbot asks the user to provide their application's Google play URL. After that, the app reviews can be pulled via Google Play Scrapper and the latest 1000 reviews (or the available if they are below 1000) can be retrieved to make sure recent end-user demands are covered. To classify those reviews, a machine learning tool called SURF Tool may be utilized to group them into a predefined set of topics, as shown in Table 17 provided below. Therefore, the chatbot asks the user to group third-party libraries in their applications to match the classified topics generated by SURF Tool. However, topics that are related to third-party libraries are selected and rest are ignored. In an embodiment, GUI, resources, security, update/version, pricing, and contents are selected.

TABLE 17

App Reviews Topics Proposed by SURF Tool

| Topic Description | Topic Description |
|---|---|
| App | Sentences related to the app generally such as crash reports or ratings |
| GUI | Sentences related to the Graphical User Interface |
| Content | Sentences related to the App content |
| Pricing | Sentences related to the App pricing |
| Feature or Functionality | Sentences related to a specific functionality |
| Improvement | Sentences related to improvement requests |
| Update/Versions | Sentences related to updates or app versions |
| Resources | Sentences related to device resources |
| Security | Sentences related to the app security or privacy issues |
| Download | Sentences related to the app download |
| Model | Sentences related to the device model or version |
| Company | Sentences related to the company or the team |

According to an exemplary implementation, the prioritization approach is implemented as a software chatbot which provides the ability to adapt to changes. In an embodiment, the RASA framework may be used to build the chatbot. The RASA framework is a Python-based framework to build chatbots. As described earlier, a set of tools are used to calculate the metrics. The set of tools can be combined into a single software chatbot to give the user ability to calculate/recalculate any metric and provide instant feedback to the chatbot as well. Once all criteria and metrics are calculated, the libraries can be ranked. Hence, the chatbot asks the user to make a pairwise comparison between four criteria namely, compatibility, accessibility, update effort, and business value. In case the consistency index is more than 10%, the chatbot asks the user to reconsider the important values so it can generate valid weights according to analytic hierarchy process.

Figure 15:
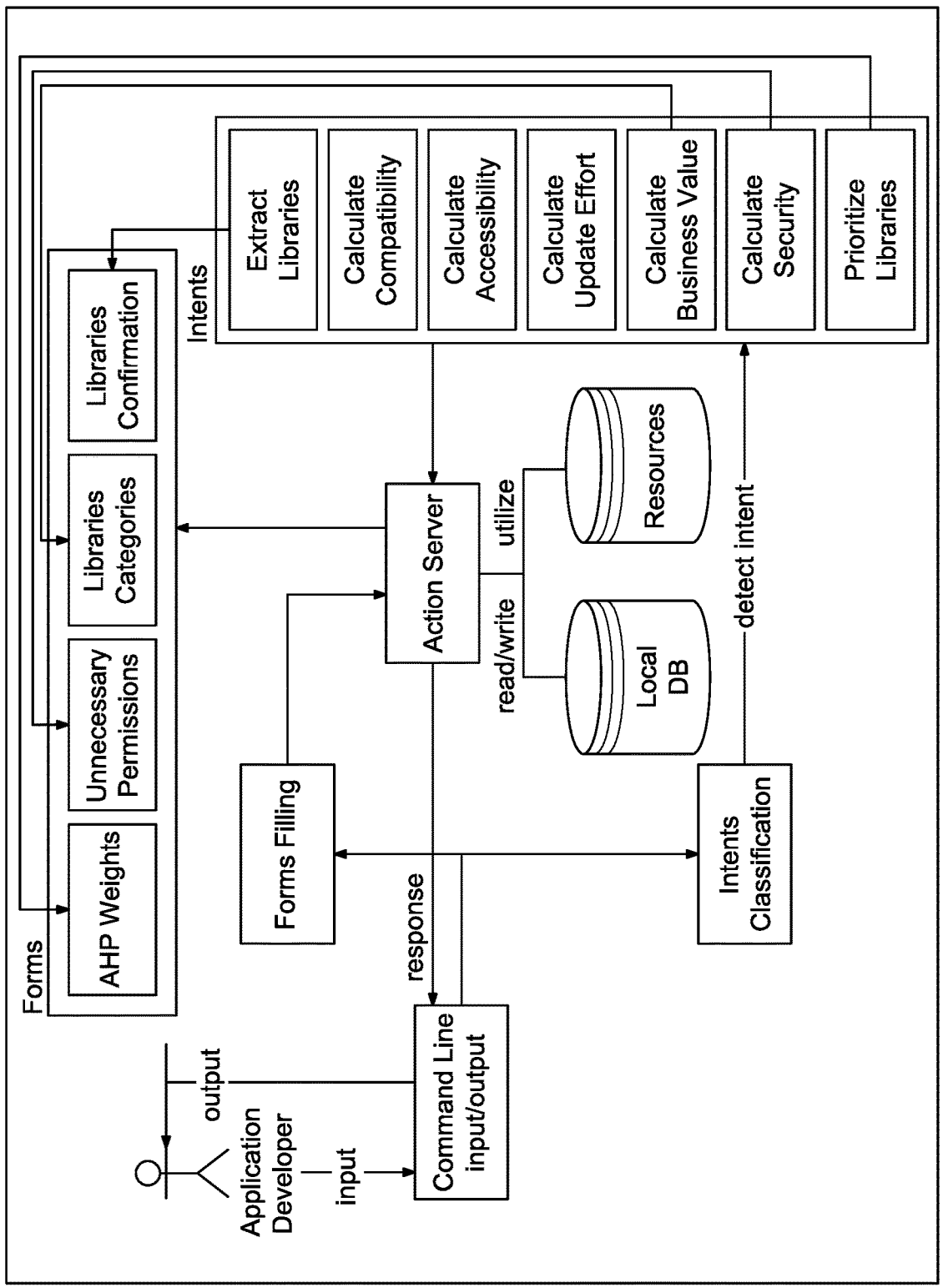
FIG. 15 describes an architecture of the chatbot, according to certain embodiments.

FIG. 15 describes an architecture 1500 of the chatbot, according to certain embodiments.

Figure 17:
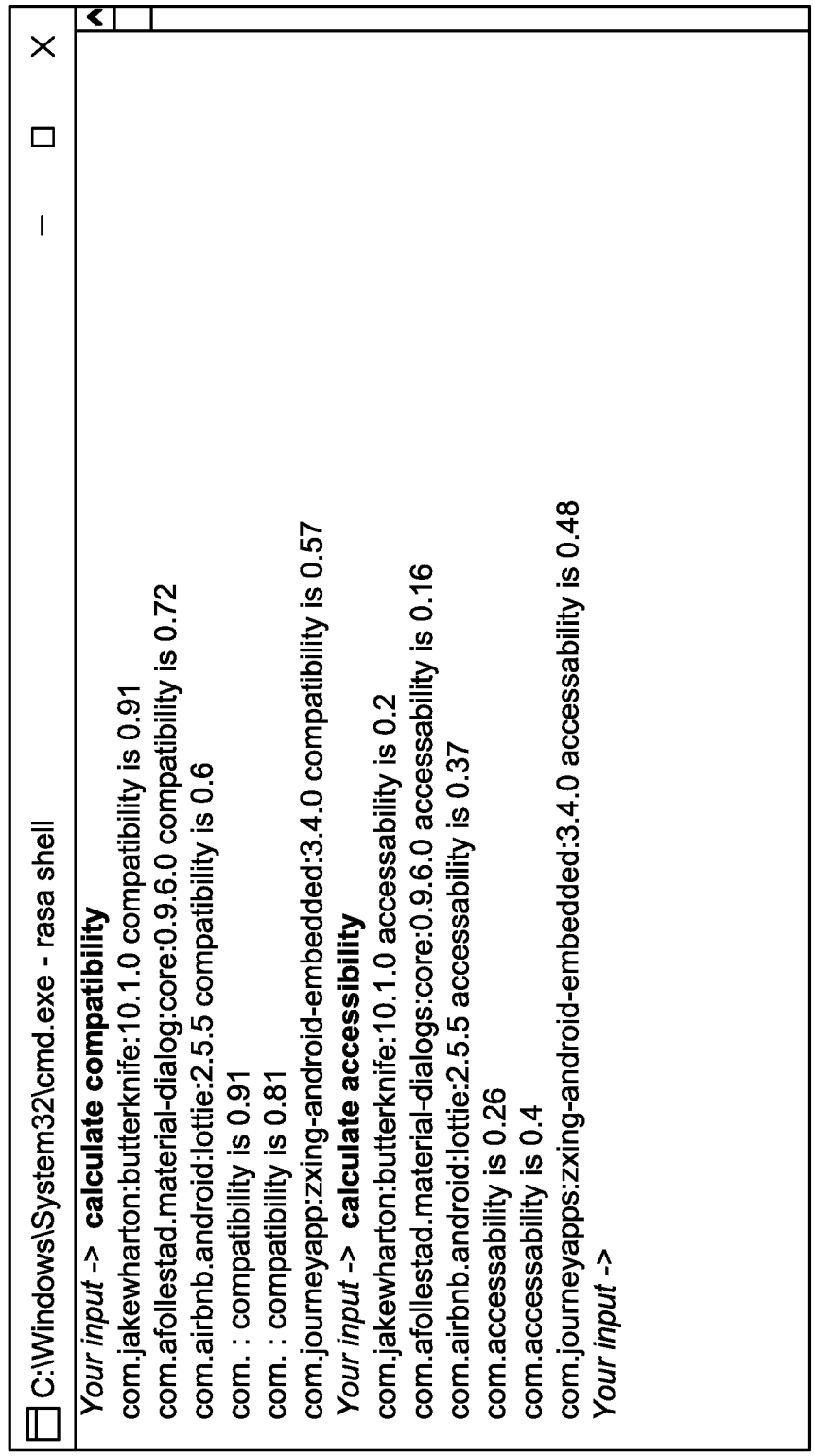
FIG. 17 illustrates a display of chatbot compatibility and accessibility results, according to certain embodiments.
Figure 18:
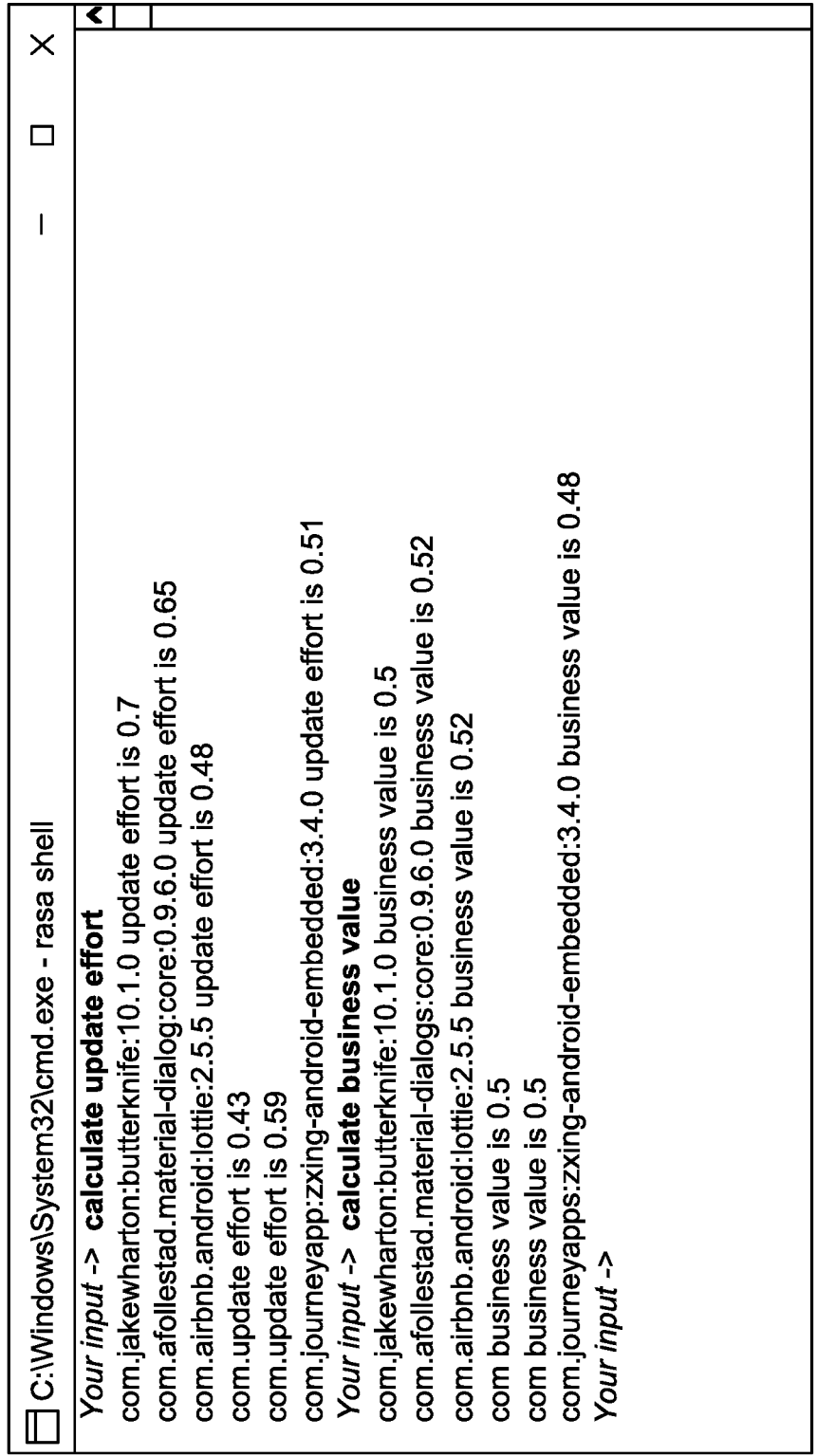
FIG. 18 illustrates a display of chatbot update effort and business value results, according to certain embodiments.

According to an implementation, a user input is received and classified into either intent or considered as a form field (if a form is activated). In an example, there may be seven intents, and five of them may be related to the five criteria, and the last two may be related to libraries extraction and ranking (analytic hierarchy process). However, some intents may be linked to forms. For example, calculate security intent may be linked to unnecessary permissions forms which asks the user if new permission is considered unnecessary or not. After detecting the intent, an action server may decide what to do next. For instance, to calculate accessibility, the action server needs only to communicate with GitHub API and measure the metrics based on the data. In an implementation, the action server may send the results back to the command line. The actions server may manage the logic responsible for calculating criteria and activating/deactivating forms. FIG. 16 through FIG. 18 are user interfaces that illustrate the chatbot results, according to certain embodiments. In particular, FIG. 16 illustrates a display of chatbot prioritization results, FIG. 17 illustrates a display of dot compatibility and accessibility results, and FIG. 18 illustrates a display of chatbot update effort and business value results. The implementation of the present approach is currently designed for Android applications that use gradle as the dependencies management system. However, the design of the metrics and the prioritization approach is flexible. Therefore, adopting the approach in another environment, e.g., the iOS platform, is applicable with some modifications to suit that platform.

According to an implementation, to make sure the results are neutral and not related to a specific case study, three projects (namely project A, project B, and project C) are selected from GitHub, a well-known platform for open-source projects and collaboration. Two projects are considered highly active in terms of the level of contribution, whereas the last one is less active. This diversity may help the evaluation process since some of our metrics are related to the time span, e.g., update delay (UD). Hence, less active projects should have a higher gap between installed libraries and their last versions.

Example 1

An example project is a documents conversion application which is approximately 5 years old. The example project is considered an active project and has a high contribution rate. The example project uses 12 third-party libraries, 6 of them are outdated and considered in the evaluation. Table 18 provided below shows details about its contribution level.

TABLE 18

Example 1 Details

| Age | ~5 years |
|---|---|
| Forks | ~600 |
| Stars | ~650 |
| Number of Contributors | ~120 |
| Releases | ~20 |
| Available on Google Play? | yes |
| Ratings | ~1K |
| Installs | ~90K |

Example 2

An example project is a note-taking application which is approximately 1 year old. The example project is considered an active project and has a high contribution rate. The example project uses 8 third-party libraries, 6 of them are outdated and are considered in the evaluation. Table 19 shows details about its contribution level.

TABLE 19

Example 2 Details

| | |
|---|---|
| Age | ~2 years |
| Forks | ~10 |
| Stars | ~100 |
| Number of Contributors | ~5 |
| Releases | ~50 |
| Available on Google Play? | yes |
| Ratings | N/A |
| Installs | ~10K |

Example 3

An example project is a task management application which is approximately 2 years old. The example project is considered an inactive project. The example project uses 6 third-party libraries, 4 of them are outdated and considered in our evaluation. Table 20 shows details about its contribution level.

TABLE 20

Example 3 Details

| | |
|---|---|
| Age | ~2 years |
| Forks | ~10 |
| Stars | ~40 |
| Number of Contributors | ~4 |
| Releases | ~6 |
| Available on Google Play? | Yes |
| Ratings | N/A |
| Installs | ~1K |

An empirical validation with three case studies and six evaluators has been conducted. All of the evaluators have software development work experience ranging from 3 to 10 years, with an average of 5.6 years, and three of them have experience in mobile app development. They have asked to validate the results for each metric, given only the factor (metric) definition and its value, each evaluator evaluated at least two projects. Five scale validation can be implemented (Strongly Agree (1), Agree (2), Neutral (3), Disagree (4), and Strongly Disagree (5)). Also, their comments and recommendations are collected. To analyze the results and make a conclusion, the strongly agree and agree responses are measured as positive responses, whereas disagree and strongly disagree responses are measured as negative responses toward the metric. Therefore, for each factor, its acceptance rate (strongly agree and agree) are measured, and the average across the three projects is calculated. Table 21 provided below shows the average acceptance rate for each factor.

TABLE 21

Empirical Validation Results

| Factor | Acceptance Rate (Average) |
|---|---|
| DU | 86% |
| UD | 86% |

TABLE 21-continued

Empirical Validation Results

| Factor | Acceptance Rate (Average) |
|---|---|
| BCR | 41% |
| FR | 74% |
| PRR | 96% |
| PRMR | 75% |
| CR | 91% |
| ACR | 80% |
| ICR | 72% |
| SPCR | 56% |
| SFS | 50% |
| ARM | 50% |
| MSS | 63% |
| VC | 65% |
| UPC | 46% |

Overall, there is a high acceptance rate for most factors with an average of 71%, 83%, 60%, 56%, and 55% for compatibility, accessibility, update effort, business value, and security factors, respectively. It has been found BCR, SPCR, SFS, ARM, and UPC factors have an acceptance rate around 50%. After further analysis of the validators' feedback, it has been found that they prefer to be neutral on the factors that are hard to measure manually, such as BCR, SFS and ARM.

To evaluate the usefulness of the final tool, evaluation sessions are conducted with a case study (project A). Three developers are asked to evaluate and evaluate the chatbot in terms of usability, usefulness, performance, and the final results on five scales (Excellent, Above Average, Above Average, Below Average, Poor). Moreover, the developers have asked for their comments and recommendations. Table 22 provided below describes the evaluation results with background about evaluators experiences.

TABLE 22

Chatbot Evaluation Results

| Question | Evaluator 1 | Evaluator 2 | Evaluator 3 |
|---|---|---|---|
| How many years in software development do you have? | 3 | 3 | 7 |
| How many years in software development do you have for mobile applications? | 2 | 0.5 | 1 |
| Have you ever worked with the Android platform? | Yes | Yes | No |
| How do you evaluate thechatbot usefulness? | Above Average | Average | Excellent |
| How do you evaluate thechatbot usability? | Above Average | Above Average | Above Average |
| How do you evaluate thechatbot performance? | Average | Average | Above Average |
| How do you evaluate thechatbot's final results? | Excellent | Above Average | Above Average |
| Do you think thechatbot is suitable for the industry needs? | Yes | Yes | Yes |
| Generally, what do you recommend to be improved in | It is recommended to add default values | Interactive explanations for | 1-To addchatbot command |

TABLE 22-continued

Chatbot Evaluation Results

| Question | Evaluator 1 | Evaluator 2 | Evaluator 3 |
| --- | --- | --- | --- |
| thechatbot? or other recommendations | (Best practice values) for calculating the relation between the evaluations factors and give the user the option to either enter the relation or choose the default values | commands and results, increase performance | that deletes current results, libraries files 2-Show percentage % instead of decimal percentage 3-Add one command for the entire process 4-Thechatbot should extract library category instead of asking the user |

The present disclosure is compared with the available tools from the literature and the industry. Gradle-related tools are considered since the approach is currently designed for android applications. Moreover, the present disclosure is compared with one of the recent studies related to third-party libraries update. Table 23 provided below describes the comparison results. The current tools are either focusing on security, e.g., Dependabot, or work as notification for the updates instead of the manual search process such as in the gradle-related tools. Moreover, DeepLib focus on mining similar updates plans. Hence, it requires creating a dataset of related projects and training the model.

TABLE 23

Comparison of Related Approaches

| # | Approach | Methodology | Requirements | Main Output | Perform the Update |
| --- | --- | --- | --- | --- | --- |
| 1 | DeepLib | A deep learning approach to mine other projects for similar update plans. Therefore, can suggest the appropriate next version of the library to be installed | A dataset of related projects to train the model | Next Version of the Installed Libraries | No |
| 2 | Dependabot | A chatbot that updates libraries which have security issues | Available on GitHub | Update request for the library | Yes |
| 3 | Gradle Versions Plugin | A Plugin that notifies developers about available updates for the libraries | Available on Gradle | Report of the available updates for each library | No |
| 4 | Gradle Use Latest Versions Plugin | A Plugin that updates the libraries to the latest versions | Available on Gradle | Update of the installed library | Yes |
| 5 | Present Disclosure | A metric-based approach based on five criteria (Compatibility, Accessibility, Update Effort, Business Value, and Security). It uses AHP method to generate valid weights for each criterion and rank the updates accordingly | The gradle file | Prioritized list of libraries for update | No |

Figure 19:
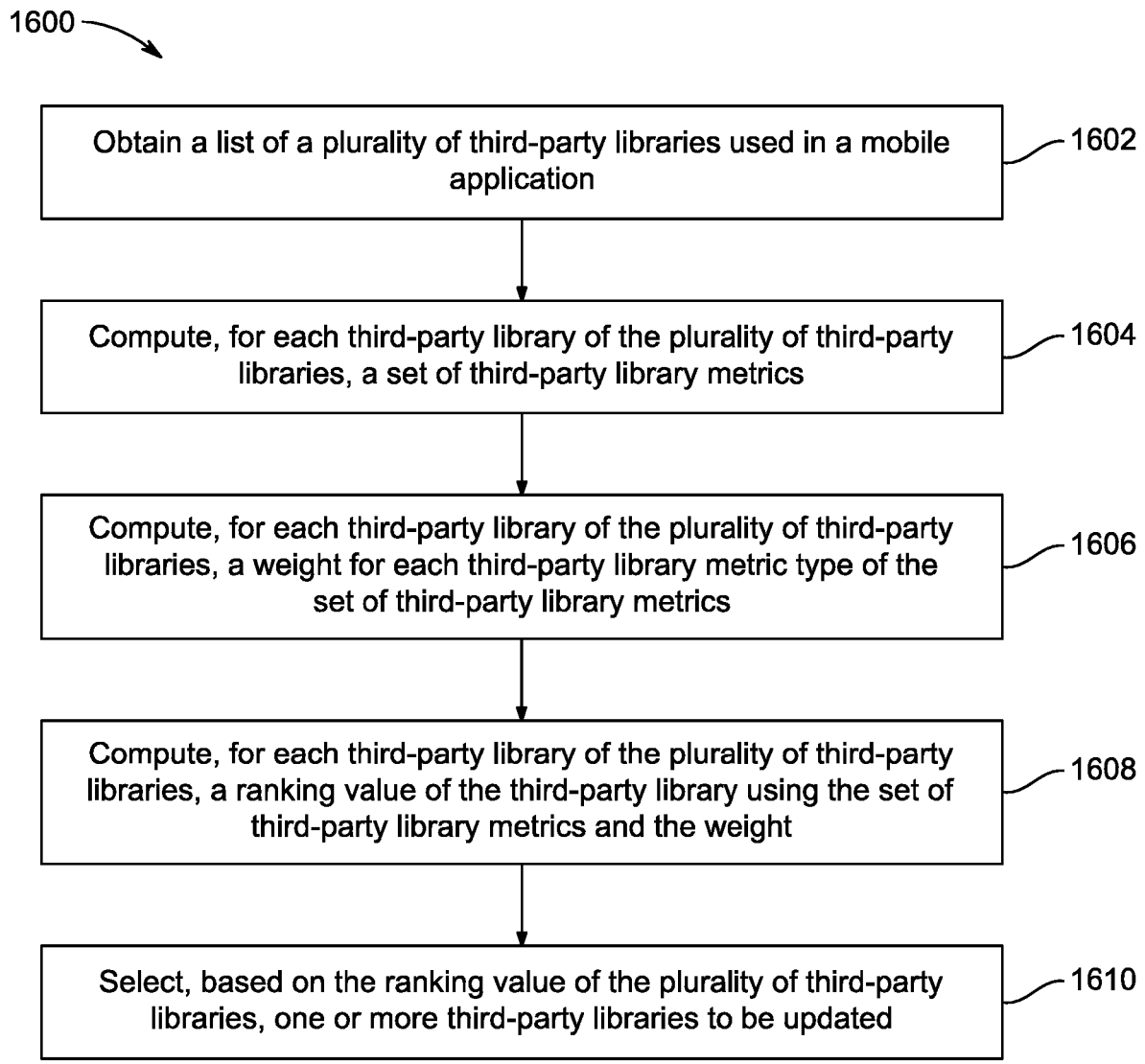
FIG. 19 illustrates an exemplary flowchart for prioritizing updates to third-party libraries for a mobile application, according to certain embodiments.

FIG. 19 illustrates an exemplary flowchart 1600 for prioritizing updates to third-party libraries for a mobile application, according to certain embodiments.

At step 1602 of the flowchart 1600, a list of the third-party libraries used in a mobile application may be obtained. In an exemplary implementation, the processing circuitry 106 may be configured to obtain the list of the plurality of third-party libraries used in the mobile application 108.

At step 1604 of the flowchart 1600, for each third-party library of the third-party libraries, a set of third-party library metrics may be computed. According to an exemplary implementation, the processing circuitry 106 may be configured to compute the set of third-party library metrics for each third-party library of the plurality of third-party libraries. In an embodiment, the set of third-party library metrics may include a compatibility metric that measures a failure rate of a software application when using the current third-party library and when using an updated third-party library. The software application may be the mobile application 108 having the user interface 110. In an embodiment, the obtaining includes inputting, via the user interface 110, the list of the third-party libraries. In some embodiments, the set of third-party metrics may include an accessibility metric that measures the use rate of the third-party library. In some embodiments, the set of third-party metrics include an update effort metric that measures the rate of change of the third-party library. The set of third-party metrics include a business value metric that measures user feedback on the third-party library. The set of third-party metrics include a security metric that measures the number of security vulnerabilities in the software application when using the current third-party library and when using the updated third-party library. In an embodiment, the selecting of one or more third-party libraries to be updated gives priority to the security metric of the third-party library.

At step 1606 of the flowchart 1600, for each third-party library of the third-party libraries, a weight for each third-party library type of the set of third-party library metrics may be computed. According to an exemplary implementation, the processing circuitry 106 may be configured to compute, for each third-party library of the plurality of third-party libraries, the weight for each third-party library type of the set of third-party library metrics. In examples, the computing the weight includes generating a set of weights using an analytic hierarchy process, and the computing the ranking value includes generating the ranking value using simple additive weighting.

At step 1608 of the flowchart 1600, for each third-party library of the plurality of third-party libraries, a ranking value of the third-party library using the set of third-party library metrics and the weight may be computed. According to an exemplary implementation, the processing circuitry 106 may be configured to compute, for each third-party library of the third-party libraries, the ranking value of the third-party library using the set of third-party library metrics and the weight.

At step 1610 of the flowchart 1600, based on the ranking value of the plurality of third-party libraries, one or more third-party libraries to be updated may be selected. According to an exemplary implementation, the processing circuitry 106 may be configured to select, based on the ranking value of the plurality of third-party libraries, one or more third-party libraries to be updated.

Figure 20:
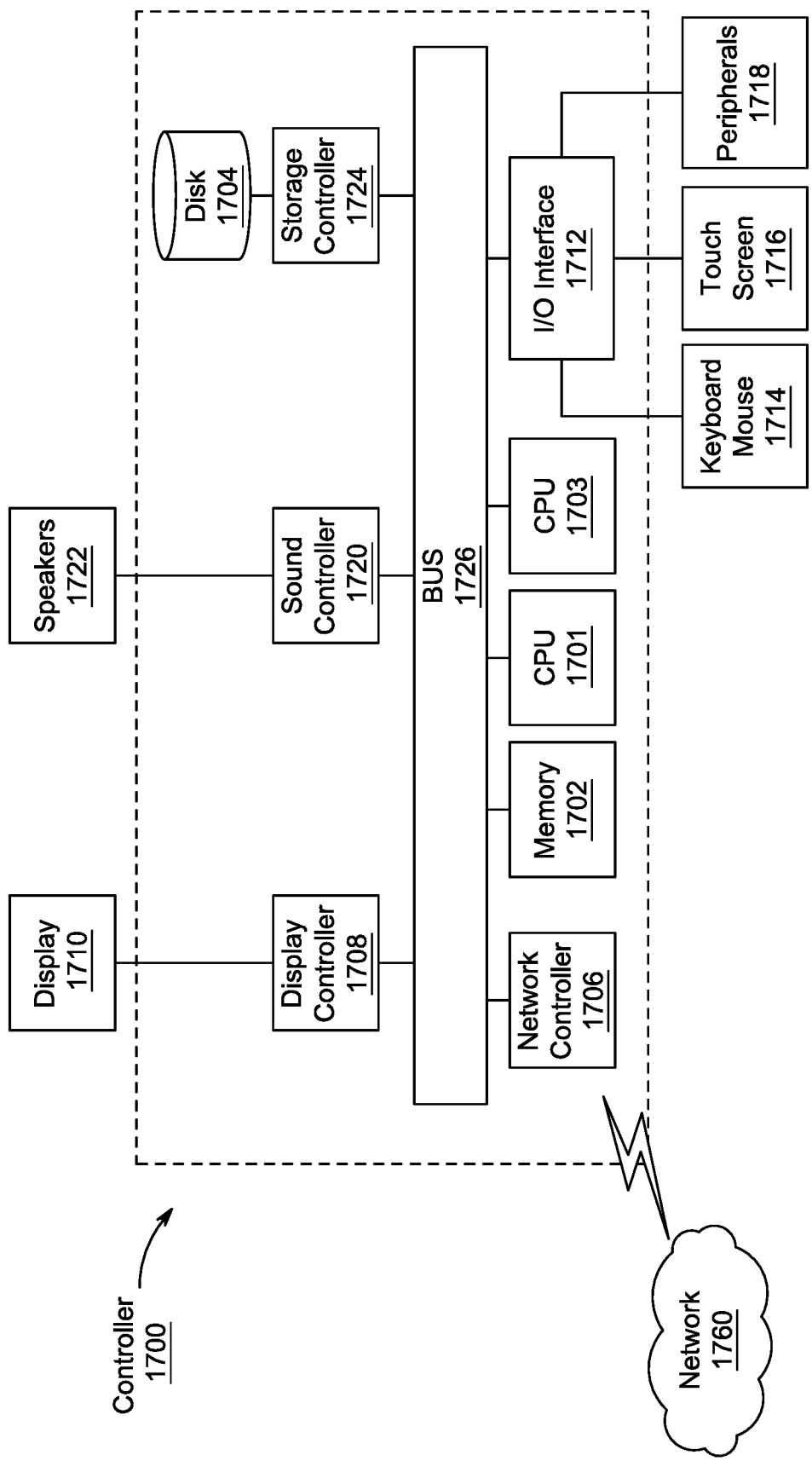
FIG. 20 is an illustration of a non-limiting example of details of computing hardware used in the computing system.

FIG. 20 is an illustration of a non-limiting example of details of computing hardware used in the computing system.

Next, further details of the hardware description of the computing environment according to exemplary embodiments is described with reference to FIG. 20. FIG. 20 is an illustration of a non-limiting example of details of computing hardware used in the computing system, according to exemplary aspects of the present disclosure. In FIG. 20, a controller 1700 is described which is a computing device (for example, the interactive system 100) and includes a CPU 1701 which performs the processes described above/below. The process data and instructions may be stored in memory 1702. These processes and instructions may also be stored on a storage medium disk 1704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1701, 1703 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1701 or CPU 1703 may be a Xenon or Core processor from Intel of America or an Opteron processor from AMD of America, or may be other processor types that would be recognized by one of ordinary skill in the art. Alternatively, the CPU 1701, 1703 may be implemented on an FPGA, ASIC, PLD or using discrete logic circuits, as one of ordinary skill in the art would recognize. Further, CPU 1701, 1703 may be implemented as multiple processors cooperatively working in parallel to perform the instructions of the inventive processes described above.

The computing device in FIG. 20 also includes a network controller 1706, such as an Intel Ethernet PRO network interface card from Intel Corporation of America, for interfacing with network 1760. As can be appreciated, the network 1760 can be a public network, such as the Internet, or a private network such as an LAN or WAN network, or any combination thereof and can also include PSTN or ISDN sub-networks. The network 1760 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1708, such as a NVIDIA GeForce GTX or Quadro graphics adaptor from NVIDIA Corporation of America for interfacing with display 1710, such as a Hewlett Packard HPL2445w LCD monitor. A general purpose I/O interface 1712 interfaces with a keyboard and/or mouse 1714 as well as a touch screen panel 1716 on or separate from display 1710. General purpose I/O interface also connects to a variety of peripherals 1718 including printers and scanners, such as an OfficeJet or DeskJet from Hewlett Packard.

A sound controller 1720 is also provided in the computing device such as Sound Blaster X-Fi Titanium from Creative, to interface with speakers/microphone 1722 thereby providing sounds and/or music. The general purpose storage controller 1724 connects the storage medium disk 1704 with communication bus 1726, which may be an ISA, EISA, VESA, PCI, or similar, for interconnecting all of the components of the computing device. A description of the general features and functionality of the display 1710, keyboard and/or mouse 1714, as well as the display controller 1708, storage controller 1724, network controller 1706, sound controller 1720, and general purpose I/O interface 1712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 21.

Figure 21:
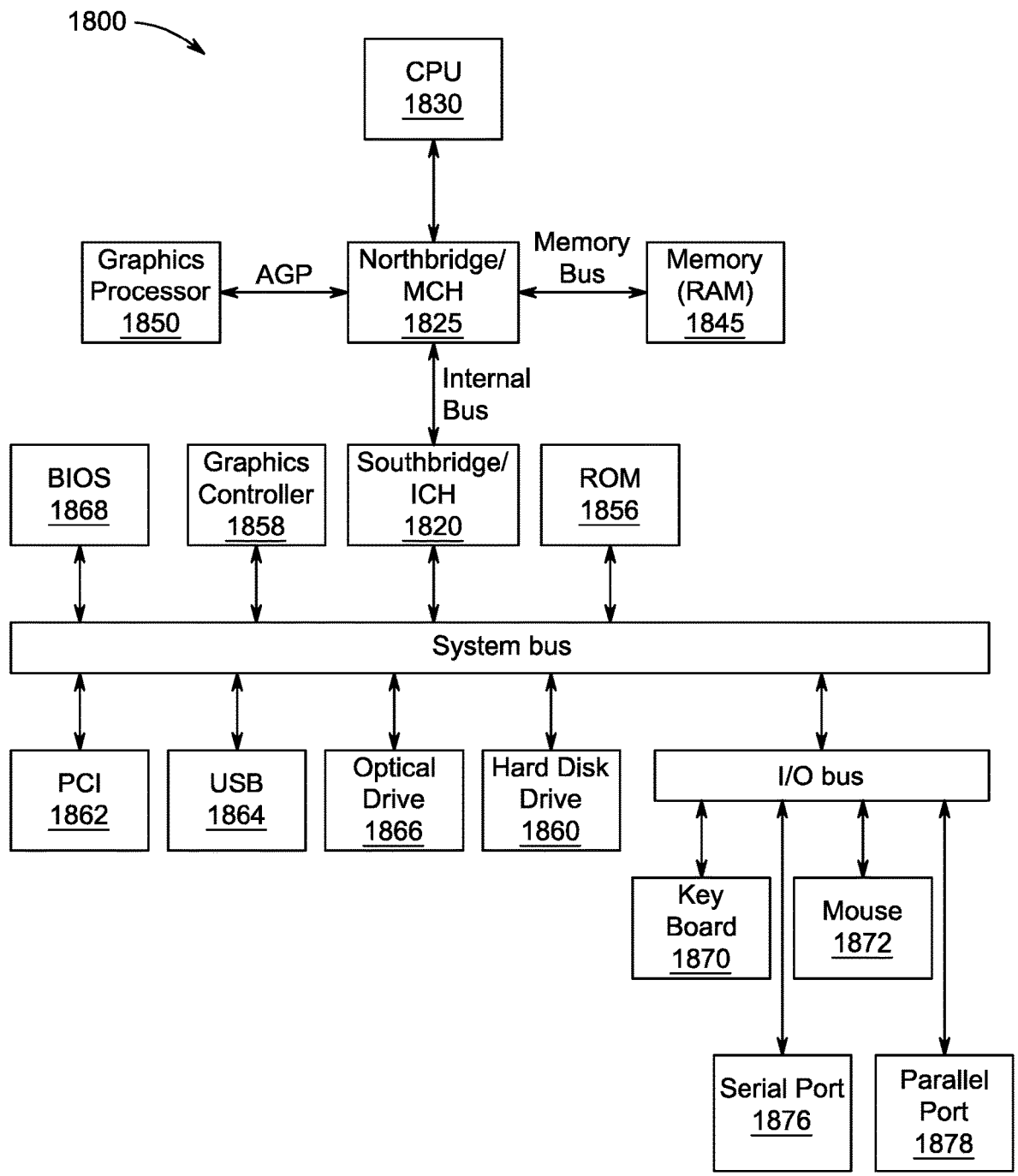
FIG. 21 is an exemplary schematic diagram of a data processing system used within the computing system.

FIG. 21 shows a schematic diagram of a data processing system 1800 for performing the functions of the exemplary embodiments. The data processing system 1800 is an example of a computer in which code or instructions implementing the processes of the illustrative embodiments may be located.

In FIG. 21, data processing system 1800 employs a hub architecture including a north bridge and memory controller hub (NB/MCH) 1825 and a south bridge and input/output (I/O) controller hub (SB/ICH) 1820. The central processing unit (CPU) 1830 is connected to NB/MCH 1825. The NB/MCH 1825 also connects to the memory 1845 via a memory bus, and connects to the graphics processor 1850 via an accelerated graphics port (AGP). The NB/MCH 1825 also connects to the SB/ICH 1820 via an internal bus (e.g., a unified media interface or a direct media interface). The CPU Processing unit 1830 may contain one or more processors and even may be implemented using one or more heterogeneous processor systems.

Figure 22:
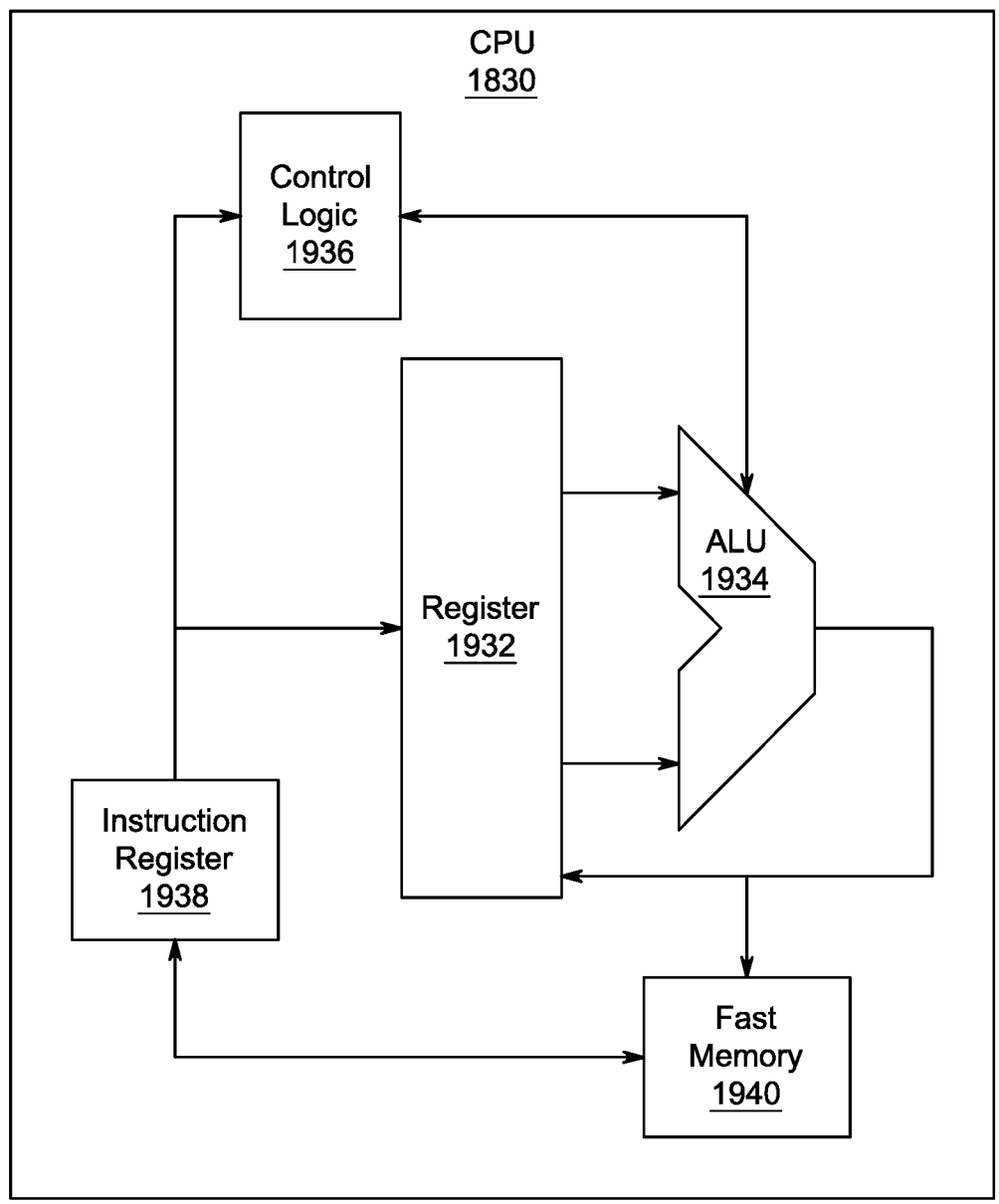
FIG. 22 is an exemplary schematic diagram of a processor used with the computing system.

For example, FIG. 22 shows one implementation of CPU 1830. In one implementation, the instruction register 1938 retrieves instructions from the fast memory 1940. At least part of these instructions are fetched from the instruction register 1938 by the control logic 1936 and interpreted according to the instruction set architecture of the CPU 1930. Part of the instructions can also be directed to the register 1932. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using the arithmetic logic unit (ALU) 1934 that loads values from the register 1932 and performs logical and mathematical operations on the loaded values according to the instructions. The results from these operations can be feedback into the register and/or stored in the fast memory 1940. According to certain implementations, the instruction set architecture of the CPU 1830 can use a reduced instruction set architecture, a complex instruction set architecture, a vector processor architecture, a very large instruction word architecture. Furthermore, the CPU 1930 can be based on the Von Neuman model or the Harvard model. The CPU 1930 can be a digital signal processor, an FPGA, an ASIC, a PLA, a PLD, or a CPLD. Further, the CPU 1830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 21, the data processing system 1800 can include that the SB/ICH 1820 is coupled through a system bus to an I/O Bus, a read only memory (ROM) 1856, universal serial bus (USB) port 1864, a flash binary input/output system (BIOS) 1868, and a graphics controller 1858. PCI/PCIe devices can also be coupled to SB/ICH 1820 through a PCI bus 1862.

The PCI devices may include, for example, Ethernet adapters, add-in cards, and PC cards for notebook computers. The Hard disk drive 1860 and CD-ROM 1856 can use, for example, an integrated drive electronics (IDE) or serial advanced technology attachment (SATA) interface. In one implementation, the I/O bus can include a super I/O (SIO) device.

Further, the hard disk drive (HDD) 1860 and optical drive 1866 can also be coupled to the SB/ICH 1820 through a system bus. In one implementation, a keyboard 1870, a mouse 1872, a parallel port 1878, and a serial port 1876 can be connected to the system bus through the I/O bus. Other peripherals and devices that can be connected to the SB/ICH 1820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 23, in addition to various human interface and communication devices (e.g., display monitors, smart phones, tablets, personal digital assistants (PDAs)).

Figure 23:
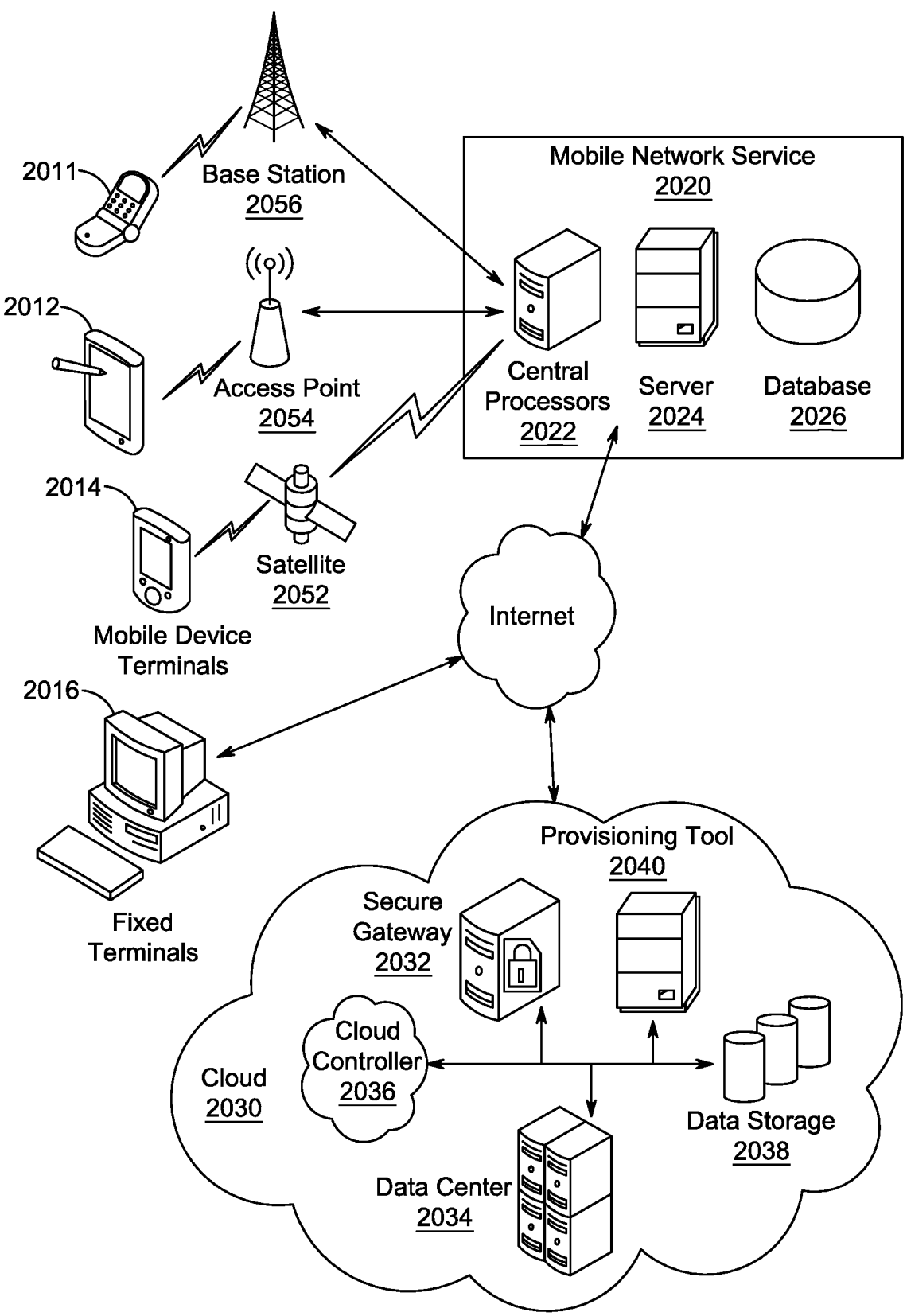
FIG. 23 is an illustration of a non-limiting example of distributed components which may share processing with the controller.

More specifically, FIG. 23 illustrates client devices including a smart phone 2011, a tablet 2012, a mobile device terminal 2014 and fixed terminals 2016. These client devices may be commutatively coupled with a mobile network service 2020 via base station 2056, access point 2054, satellite 2052 or via an internet connection. Mobile network service 2020 may comprise central processors 2022, a server 2024 and a database 2026. Fixed terminals 2016 and mobile network service 2020 may be commutatively coupled via an internet connection to functions in cloud 2030 that may comprise security gateway 2032, data center 2034, cloud controller 2036, data storage 2038 and provisioning tool 2040. The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are possible.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method of prioritizing updates to third-party libraries for a mobile application, comprising:
    obtaining a list of a plurality of third-party libraries used in the mobile application;
    for each third-party library of the plurality of third-party libraries:
        computing a set of third-party library metrics of a third-party library;
        computing a weight for each third-party library metric type of the set of third-party library metrics;
    computing, for each third-party library of the plurality of third-party libraries, a ranking value of the third-party library using the set of third-party library metrics and the weights; and
    selecting, based on the ranking value of the plurality of third-party libraries, one or more third-party libraries to be updated;
    wherein the set of third-party library metrics include a compatibility metric that measures a failure rate of a software application when using a current third-party library and when using an updated third-party library;
    wherein the software application is a mobile application having a user interface, and
    wherein the obtaining includes inputting, via the user interface, the list of the plurality of third-party libraries.

2. The method of claim 1, wherein the set of third-party library metrics include an accessibility metric that measures a use rate of the third-party library.

3. The method of claim 1, wherein the set of third-party library metrics include an update effort metric that measures a rate of change of the third-party library.

4. The method of claim 1, wherein the set of third-party library metrics include a business value metric that measures user feedback of the third-party library.

5. The method of claim 1, wherein the set of third-party library metrics include a security metric that measures a number of security vulnerabilities in a software application when using a current third-party library and when using the updated third-party library.

6. The method of claim 5, wherein the selecting of one or more third-party libraries to be updated gives priority to the security metric of the third-party library.

7. The method of claim 1, wherein the computing the weight includes generating a set of weights using an analytic hierarchy process, and wherein the computing the ranking value includes generating the ranking value using simple additive weighting.

8. An interactive system for prioritizing updates to third-party libraries for a mobile application, comprising:
 a user input device;
 a display device;
 processing circuitry configured to
 obtain a list of a plurality of third-party libraries used in the mobile application;
 for each third-party library of the plurality of third-party libraries:
  compute a set of third-party library metrics of a third-party library;
  compute a weight for each third-party library metric type of the set of third-party library metrics;
 compute, for each third-party library of the plurality of third-party libraries, a ranking value of the third-party library using the set of third-party library metrics and the weights; and
 select, based on the ranking value of the plurality of third-party libraries, one or more third-party libraries to be updated;
 wherein the set of third-party library metrics include a compatibility metric that measures a failure rate of a software application when using a current third-party library and when using an updated third-party library;
 wherein the software application is a mobile application having a user interface, and
 wherein the obtaining, by the processing circuitry, includes inputting, via the user interface, the list of the plurality of third-party libraries.

9. The system of claim 8, wherein the set of third-party library metrics include an accessibility metric that measures a use rate of the third-party library.

10. The system of claim 8, wherein the set of third-party library metrics include an update effort metric that measures a rate of change of the third-party library.

11. The system of claim 8, wherein the set of third-party library metrics include a business value metric that measures user feedback of the third-party library.

12. The system of claim 8, wherein the set of third-party library metrics include a security metric that measures a number of security vulnerabilities in a software application when using a current third-party library and when using the updated third-party library.

13. The system of claim 12, wherein the selecting of one or more third-party libraries to be updated, by the processing circuitry, gives priority to the security metric of the third-party library.

14. The system of claim 8, wherein the computing the weight, by the processing circuitry, includes generating a set of weights using an analytic hierarchy process, and
 wherein the computing the ranking value includes generating the ranking value using simple additive weighting.

* * * * *